United States Patent
Lee

(10) Patent No.: US 8,588,295 B2
(45) Date of Patent: Nov. 19, 2013

(54) METHODS AND ELECTRONIC DEVICES FOR QUANTIZATION AND DE-QUANTIZATION

(75) Inventor: Kun-Bin Lee, Taipei (TW)

(73) Assignee: Mediatek Inc., Hsin-Chu (TW)

( * ) Notice: Subject to any disclaimer, the term of this patent is extended or adjusted under 35 U.S.C. 154(b) by 778 days.

(21) Appl. No.: 12/400,213

(22) Filed: Mar. 9, 2009

(65) Prior Publication Data
US 2010/0226429 A1  Sep. 9, 2010

(51) Int. Cl.
*H04N 7/12* (2006.01)
(52) U.S. Cl.
USPC .................................................. 375/240.03
(58) Field of Classification Search
USPC ........................................ 375/240.03, 240.25
IPC ................................................ H04N 7/26,7/12
See application file for complete search history.

(56) References Cited

U.S. PATENT DOCUMENTS

| | | | |
|---|---|---|---|
| 5,398,078 A * | 3/1995 | Masuda et al. | 348/699 |
| 5,812,788 A * | 9/1998 | Agarwal | 709/247 |
| 5,903,312 A * | 5/1999 | Malladi et al. | 375/240.03 |
| 6,385,242 B1 * | 5/2002 | Chen | 375/240.03 |
| 2003/0067866 A1 | 4/2003 | Jung | |
| 2003/0140078 A1 | 7/2003 | Feuser | |
| 2005/0141748 A1 | 6/2005 | Inoue et al. | |
| 2005/0169547 A1 | 8/2005 | Mihara | |
| 2007/0258519 A1 | 11/2007 | Srinivasan | |
| 2010/0014592 A1 * | 1/2010 | Yoshimatsu et al. | 375/240.25 |

FOREIGN PATENT DOCUMENTS

| | | |
|---|---|---|
| CN | 1910921 A | 2/2007 |
| WO | 2005076613 A1 | 8/2005 |
| WO | WO 2008/136164 | 11/2008 |

* cited by examiner

*Primary Examiner* — David Czekaj
*Assistant Examiner* — Tracy Li
(74) *Attorney, Agent, or Firm* — McClure, Qualey & Rodack, LLP

(57) ABSTRACT

Electronic devices for de-quantization are disclosed. An electronic device includes at least a multiplier. The multiplier generates a de-quantization scale by multiplying a first sub-factor by a second sub-factor after acquiring a macro-block (MB) from a bitstream. The generated de-quantization scale enables de-quantization of a block of the MB. Another electronic device includes at least a multiplier. The multiplier generates a quantization scale by multiplying the inverse of a first sub-factor by the inverse of a second sub-factor after acquiring an MB from a video sequence. The generated quantization scale enables quantization of a block of the MB.

6 Claims, 22 Drawing Sheets

METHODS AND ELECTRONIC DEVICES FOR QUANTIZATION AND DE-QUANTIZATION

BACKGROUND

The invention relates to video encoding and decoding, and more particularly, to methods and electronic devices for quantization and de-quantization.

A video sequence comprising a series of static frames requires considerable storage capacity and transmission bandwidth. A 90-min full color video stream, for example, having 640×480 pixels/frame and 15 frames/second, requires bandwidth of 640×480 (pixels/frame)×3 (bytes/pixel)×15 (frames/sec)=13.18 (MB/sec) and has a file size of 13.18 (MB/sec)×90×60=69.50 (GB). Such a sizeable digital video stream is difficult to be stored and transmitted in real time. Thus, many encoding techniques have been introduced to reduce the required memory size and transmission bandwidth.

Video encoders compliant with H.26x standards create standardized files that can be opened and played on any system with a standard-compliant decoder. Spatial and temporal redundancies of digital video can be encoded without significant visual quality degradation. H.264 coding is a generic standard, intended to be independent of a specific application, involving encoding based on statistical redundancies in temporal and spatial directions. Spatial redundancy is based on the similarity between adjacent pixels.

H.26x achieves encoding by quantizing the coefficients produced by applying DCT to 4×4 or 8×8 blocks of pixels in a picture and through motion compensation. Quantization comprises division of the DCT coefficient by a quantization scale related to quality level, with higher indices for better encoding efficiency but lower quality, and lower indices for the reverse. Conversely, H.26x achieves decoding by de-quantizing the quantized coefficients. De-quantization comprises multiplying the quantized value by a de-quantization scale related to quality level.

SUMMARY

Methods for video processing implemented in a silicon are provided. The method performs at least one of a video decoding procedure and a video encoding procedure by a video processing unit. The video decoding procedure contains at least the following steps. A macro-block (MB) to be decoded is acquired from a bitstream. Multiple first sub-factors and second sub-factors are provided for a block of the MB. Multiple de-quantization scales are generated by multiplying the first sub-factors by the second sub-factors. Multiple quantized coefficients of the block are provided. Multiple inverse quantized coefficients of the block are generated by multiplying the quantized coefficients by the de-quantization scales. The video encoding procedure contains at least the following steps. An MB to be encoded is acquired from a video sequence. Multiple inverses of first sub-factors and second sub-factors are provided for a block of the MB. Multiple quantization scales are generated by multiplying the inverse of the first sub-factors by the inverses of the second sub-factors. Multiple transformed coefficients of the block are provided. Multiple quantized coefficients of the block are generated by multiplying the transformed coefficients by the quantization scales.

Electronic devices for de-quantization are provided. An embodiment of an electronic device comprises a multiplier. The multiplier generates a de-quantization scale by multiplying a first sub-factor by a second sub-factor for an MB of a bitstream, enabling the generated de-quantization scale to de-quantize a block of the MB.

Electronic devices for quantization are provided. An embodiment of an electronic device comprises a multiplier. The multiplier generates a quantization scale by multiplying the inverse of a first sub-factor by the inverse of a second sub-factor for an MB of a video sequence, enabling the generated quantization scale to quantize a block of the MB.

BRIEF DESCRIPTION OF THE DRAWINGS

The invention can be more fully understood by reading the subsequent detailed description and examples with references made to the accompanying drawings, wherein.

DETAILED DESCRIPTION

Figure 1:
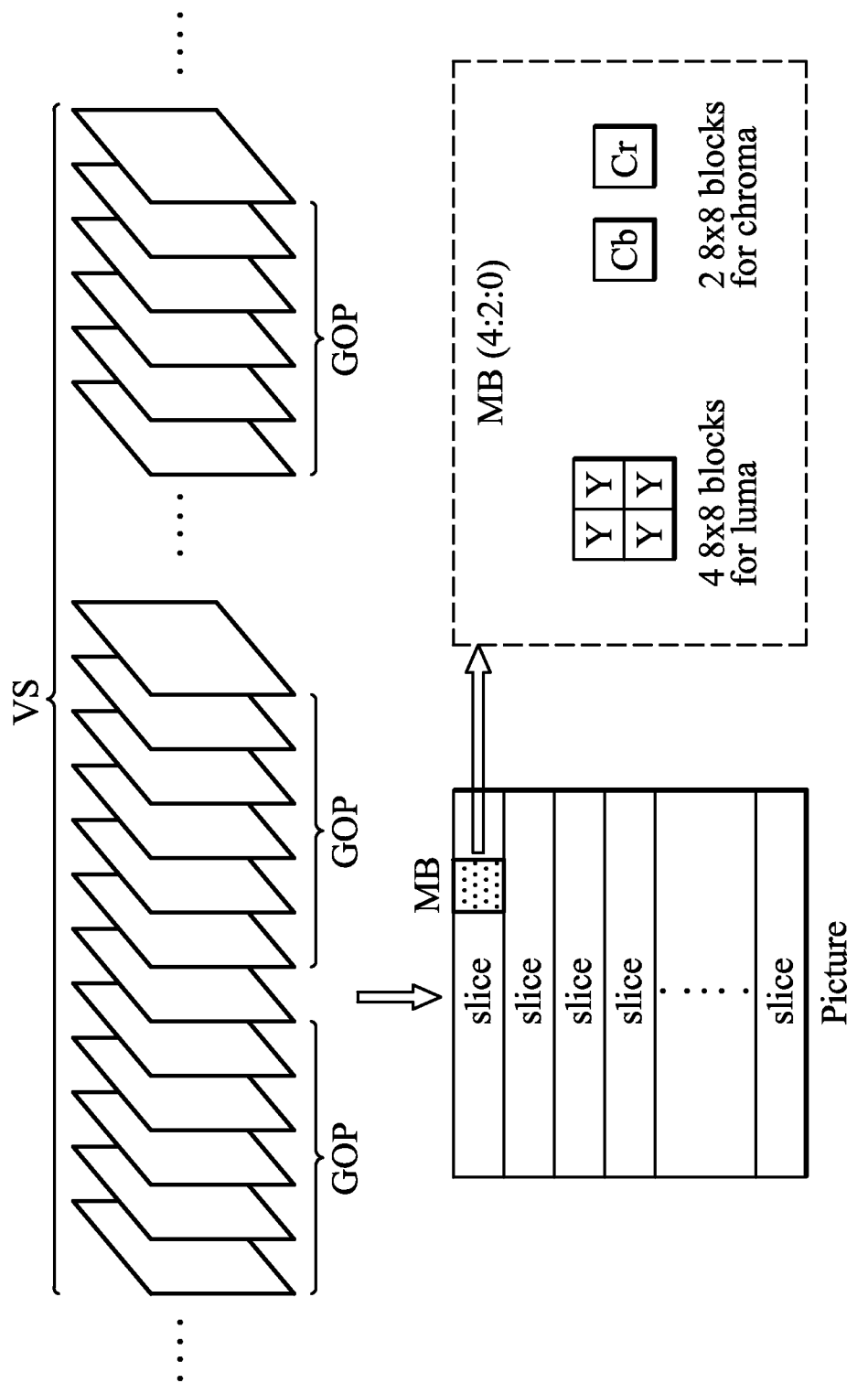
FIG. 1 is a diagram showing the picture architecture of an exemplary H.26x video sequence.

FIG. 1 is a diagram showing the picture architecture of an exemplary H.26x video sequence. A video sequence comprises multiple pictures or groups of pictures (GOPs) that can be arranged in a specific order referred to as the GOP structure. Each picture is divided into one or multiple slices (S). Each S comprises multiple macroblocks (MB). Each MB may be composed of a number of blocks of 8×8, 4×4, 8×4, 4×8, or the like pixels of luminance (luma) data and a number of blocks of 8×8, 4×4, 8×4, 4×8, or the like pixels of chrominance (chroma) data. For example, as shown in FIG. 1, an MB comprises four blocks of 8×8 pixels of luma data and two blocks of 8×8 pixels of chroma data. YCbCr is one of primary color spaces used to represents digital component video (the other is RGB). The difference between YCbCr and RGB is that YCbCr represents color as brightness and two color difference signals, while RGB represents color as red, green and blue. In YCbCr, the Y is the brightness (luma), Cb is blue minus luma (B-Y) and Cr is red minus luma (R-Y).

Figure 2:
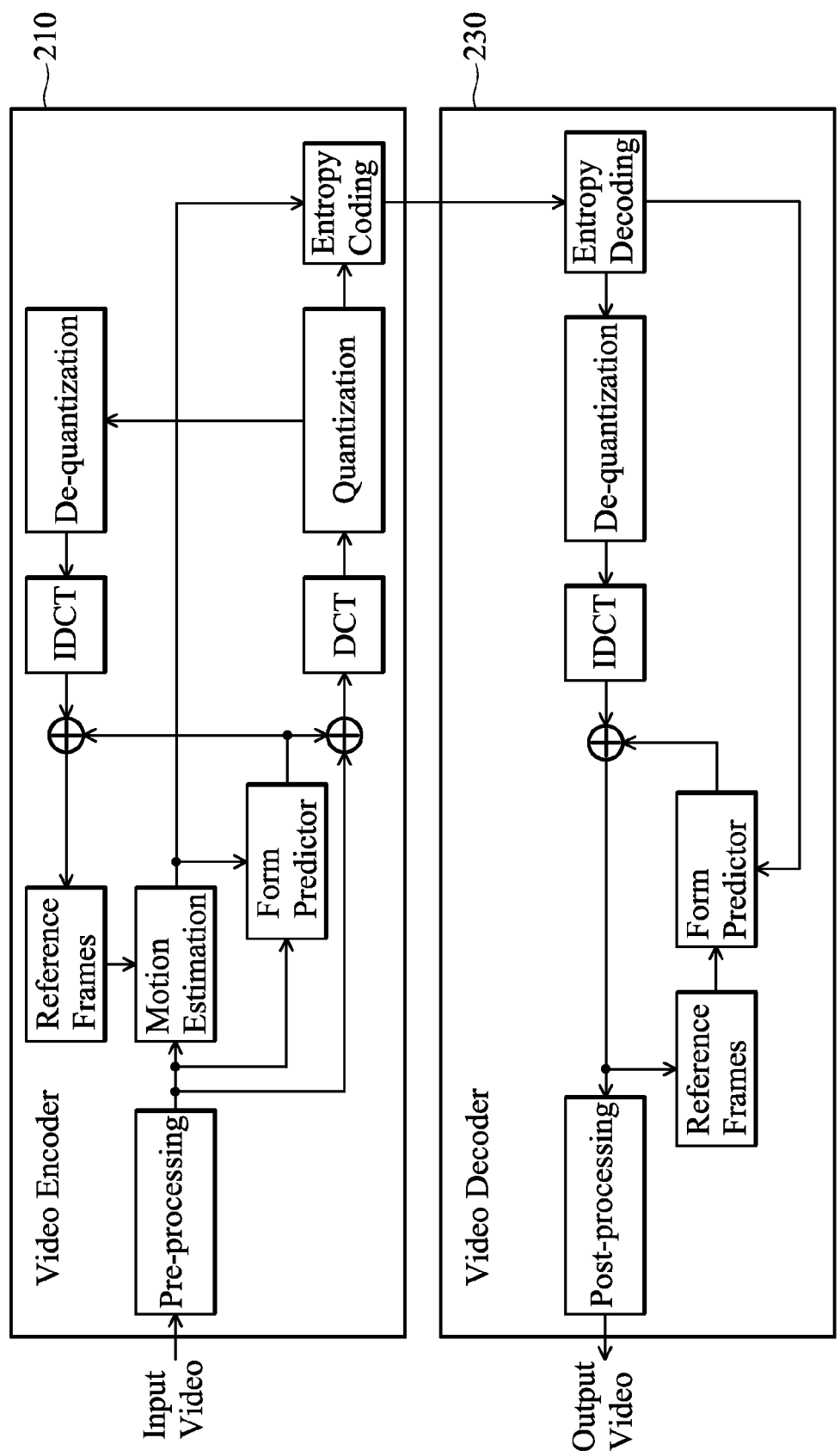
FIG. 2 is a block diagram showing an embodiment of a system of a video encoding and decoding.

FIG. 2 is a block diagram showing an embodiment of a video encoding and decoding system, such as an H.26x video encoding and decoding system. An embodiment of a system of a video encoding and decoding comprises a video encoder 210 and a video decoder 230. In the video encoder 210, the input video is typically processed MB by MB. Blockwise motion compensation predicts the value of the input video from data in previous pictures. A block transform is applied to reduce spatial statistical correlation. The popular transform includes at least the 4×4, 8×8, 4×8, 8×4, 16×16 or different-sized discrete cosine transform (DCT), integer transform, Hadamard transform and the like. The output of the transform is then quantized (Q), and entropy encoding is applied to the quantized values. In quantization, a particular quantization table is employed to quantize a block, such as Intra-predicted or -coded Y, Cb, Cr, or Inter-predicted or -coded Y, Cb, Cr, or the like. When a DCT is used, the coefficients are typically scanned using a zigzag scan order, and the entropy encoding typically combines a number of consecutive zero-valued quantized coefficients with the value of the next non-zero quantized coefficient into a single symbol, and indicates when all of the remaining quantized coefficient values are equal to zero. The entropy coding method typically uses variable-length coding (VLC) tables. In the video decoder 230, the compressed data is decoded by entropy decoding with reference to the VLC table. The output of the entropy decoding is then de-quantized ($Q^{-1}$) and reversely transformed to acquire luma or chroma data of blocks of MBs. In de-quantization, a de-quantization table is employed for a particular block to de-quantize the quantized values.

Figure 3:
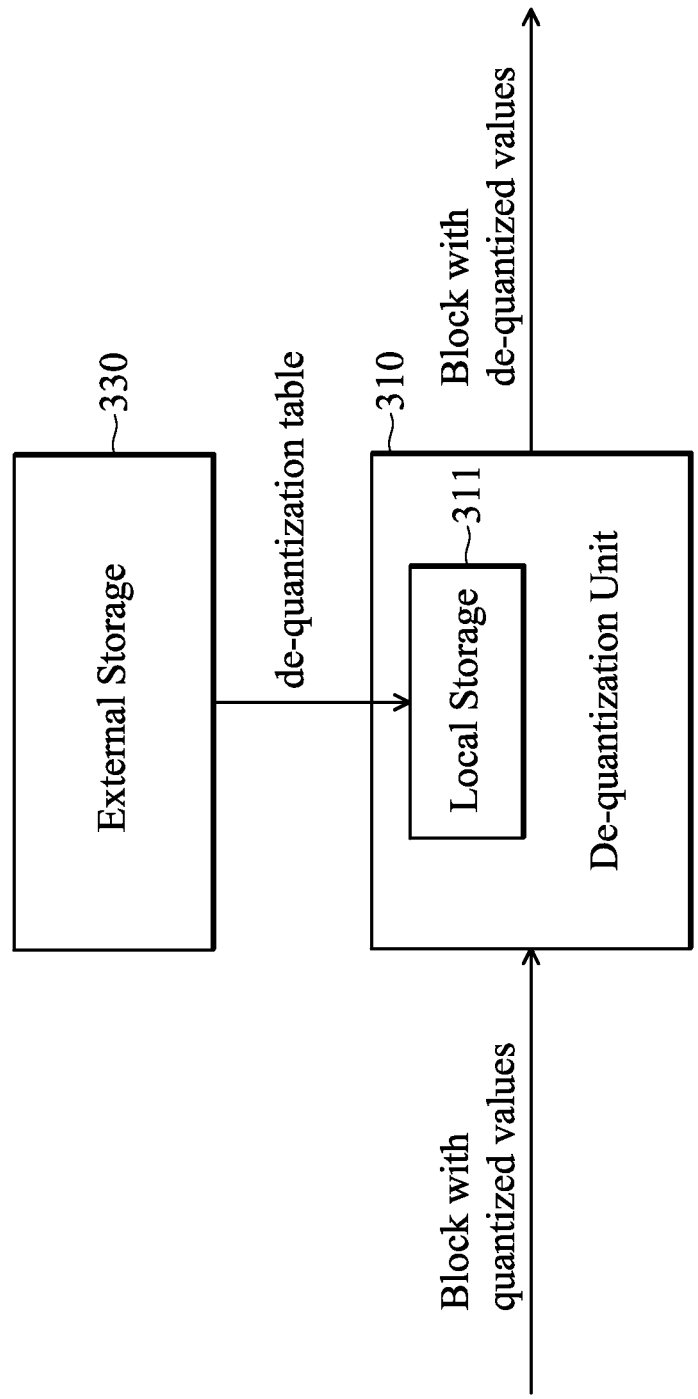
FIG. 3 is a diagram of an embodiment of a de-quantization system.

A number of quantization tables or de-quantization tables can be selectively applied to a quantization or de-quantization process for a particular type combination of blocks, such as a 4×4 or 8×8 block, an intra or inter block (i.e. intra-coded or inter-coded block), and a Y, Cb or Cr block. FIG. 3 is a diagram of an embodiment of a de-quantization system comprising a de-quantization unit 310 and an external storage 330. A local storage, such as an SRAM (static random access memory), a register or the like, is disposed in the de-quantization unit 310. The local storage can not be accessed when being currently used by the de-quantization unit 310. The external storage 330 may be DRAM (dynamic random access memory), SDRAM (synchronized DRAM), flash memory, or the like. The external storage 330 can be shared with different devices or units. When the de-quantization unit 310 performs de-quantization for an MB, three de-quantization tables of Y, Cb and Cr may be applied for de-quantization of Y, Cb and Cr blocks of the MB. Inverse quantized coefficients of the currently processed block may be calculated by an exemplary formula shown in the following:

$$T_{ij} = E_{ij} \times \text{InvLevelScale}_{ij},$$

where $T_{ij}$ represents an inverse quantized coefficient of row i of column j of the currently processed block, $E_{ij}$ represents a quantized coefficient of row i of column j of the currently processed block, which is transformed by the entropy decoding, and $\text{InvLevelScale}_{ij}$ represents a de-quantization scale of row i of column j of a de-quantization table. The de-quantization scales of a de-quantization table may be calculated by an exemplary formula shown in the following:

$$\text{InvLevelScale}_{ij} = \text{dequant}_{ij} \times q\text{-matrix}_{ij},$$

where $\text{InvLevelScale}_{ij}$ represents a de-quantization scale of row i of column j of a de-quantization table, $\text{dequant}_{ij}$ represents a value of row i of column j of a de-quantization coefficient table, and the q-matrix$_{ij}$ represents a value of row i of column j of a quantization matrix.

In H.264, eight q-matrices can be selectively applied to the currently processed block according to the currently processed block type, such as 4×4 or 8×8 block, intra block or inter block, and Y, Cb or Cr block. Specifically, the q-matrix[0], q-matrix[1] and q-matrix[2] are 4×4 q-matrices for intra Y, Cb and Cr blocks; the q-matrix[3], q-matrix[4] and q-matrix[5] are 4×4 q-matrices for inter Y, Cb and Cr blocks; and the q-matrix[6] and q-matrix[7] are 8×8 q-matrices for intra and inter Y blocks. The q-matrices may be set by the original q-matrices, or by using default q-matrices, and/or user-defined q-matrices according to flags "seq_scaling_matrix_present_flag" and "seq_scaling_list_present_flag[i]" in a sequence header, flags "pic_scaling_matrix_present_flag" and "pic_scaling_list_present_flag[i]" in a picture header, or similar flags in a header of sequence, slice, picture, GOP or MB layer. The seq_scaling_matrix_present_flag equal to 1 specifies that the flags seq_scaling_list_present_flag[i] for i=0 . . . 7 are present. The seq_scaling_matrix_present_flag equal to 0 specifies that flags seq_scaling_list_present_flag[i] are not present. An original 4×4 q-matrix "quant_org" sets q-matrices[0 . . . 5]. An original 8×8 q-matrix "quant8_org" sets the q-matrices[6 . . . 7]. It is determined that the q-matrices[0] . . . [2] are set by a 4×4 intra default q-matrix "quant_intra_default" when the seq_scaling_matrix_present_flag equals 1 and the seq_scaling_list_present_flag[0] . . . [2] equal 0. It is determined that the q-matrices[3] . . . [5] are set by a 4×4 inter default q-matrix "quant_inter_default" when the seq_scaling_matrix_present_flag equals 1 and the seq_scaling_list_present_flag[3] . . . [5] equal 0. It is determined that the q-matrix[6] is set by a 8×8 intra default q-matrix "quant8_intra_default" when the seq_scaling_matrix_present_flag equals 1 and the seq_scaling_list_present_flag[6] equals 0. It is determined that the q-matrix[7] is set by a 8×8 inter default q-matrix "quant8_inter_default" when the seq_scaling_matrix_present_flag equals 1 and the seq_scaling_list_present_flag[7] equals 0. It is determined that the q-matrix[0] . . . [2] are respectively set by user-defined q-matrices Scaling List4×4 [0] . . . [2] when the seq_scaling_matrix_present_flag equals 1 and the seq_scaling_list_present_flag[0] . . . [2] equal 1. It is determined that the q-matrices [3] . . . [5] are respectively set by user-defined q-matrices Scaling List4×4 [3] . . . [5] when the seq_scaling_matrix_present_flag equals 1 and the seq_scaling_list_present_flag [3] . . . [5] equal 1. It is determined that the q-matrix[6] is set by a user-defined q-matrix Scaling List8×8 [0] when the seq_scaling_matrix_present_flag equals 1 and the seq_scaling_list_present_flag[6] equals 1. It is determined that the q-matrix[7] is set by a user-defined q-matrix ScalingList8×8 [1] when the seq_scaling_matrix_present_flag equals 1 and the seq_scaling_list_present_flag[7] equals 1.

The detailed utilization of pic_scaling_matrix_present_flag and pic_scaling_list_present_flag[i] can be deduced by analogy. The detailed description of these flags follows section 7.4.2 of the H.264 specification "ITU-T Rec. H.264: SERIES H: AUDIOVISUAL AND MULTIMEDIA SYSTEMS Infrastructure of audiovisual services—Coding of moving video" published March 2005. Exemplary original 4×4 q-matrix "quant_org" and original 8×8 q-matrix "quant8_org" are shown in the following:

```
int quant_org[16] = {
    16, 16, 16, 16,
    16, 16, 16, 16,
    16, 16, 16, 16,
    16, 16, 16, 16
}; and
int quant_org[64] = {
    16, 16, 16, 16, 16, 16, 16, 16,
    16, 16, 16, 16, 16, 16, 16, 16,
    16, 16, 16, 16, 16, 16, 16, 16,
    16, 16, 16, 16, 16, 16, 16, 16,
    16, 16, 16, 16, 16, 16, 16, 16,
    16, 16, 16, 16, 16, 16, 16, 16,
    16, 16, 16, 16, 16, 16, 16, 16,
    16, 16, 16, 16, 16, 16, 16, 16
}.
```

Exemplary 4×4 intra default q-matrix "quant_intra_default", 4×4 inter default q-matrix "quant_inter_default", 8×8 intra default q-matrix "quant8_intra_default" and 8×8 inter default q-matrix "quant8_inter_default" are shown in the following:

```
int quant_intra_default[16] = {
    6, 13, 20, 28,
    13, 20, 28, 32,
    20, 28, 32, 37,
    28, 32, 37, 42
};
int quant_inter_default[16] = {
    10, 14, 20, 24,
    14, 20, 24, 27,
    20, 24, 27, 30,
    24, 27, 30, 34
};
int quant8_intra_default[64] = {
    6, 10, 13, 16, 18, 23, 25, 27,
    10, 11, 16, 18, 23, 25, 27, 29,
    13, 16, 18, 23, 25, 27, 29, 31,
    16, 18, 23, 25, 27, 29, 31, 33,
    18, 23, 25, 27, 29, 31, 33, 36,
    23, 25, 27, 29, 31, 33, 36, 38,
    25, 27, 29, 31, 33, 36, 38, 40,
    27, 29, 31, 33, 36, 38, 40, 42
}; and
int quant8_inter_default[64] = {
    9, 13, 15, 17, 19, 21, 22, 24,
    13, 13, 17, 19, 21, 22, 24, 25,
    15, 17, 19, 21, 22, 24, 25, 27,
    17, 19, 21, 22, 24, 25, 27, 28,
    19, 21, 22, 24, 25, 27, 28, 30,
    21, 22, 24, 25, 27, 28, 30, 32,
    22, 24, 25, 27, 28, 30, 32, 33,
    24, 25, 27, 28, 30, 32, 33, 35
}.
```

In addition, six de-quantization coefficient tables of two sizes, such as six 4×4 de-quantization coefficient tables and six 8×8 de-quantization coefficient tables, can be selectively applied to the currently processed block according to the currently processed block size, such as a 4×4 or 8×8 block. These de-quantization coefficient tables respectively comprise 16 or 64 constants defined in H.264. Six exemplary 4×4 de-quantization coefficient tables "dequant_coef[0]" to "dequant_coef[5]" in a three-dimensional data array are shown in the following:

```
const int dequant_coef[6][4][4] = {
    {{10, 13, 10, 13},{ 13, 16, 13, 16},{10, 13, 10, 13},{ 13, 16, 13, 16}},
    {{11, 14, 11, 14},{ 14, 18, 14, 18},{11, 14, 11, 14},{ 14, 18, 14, 18}},
    {{13, 16, 13, 16},{ 16, 20, 16, 20},{13, 16, 13, 16},{ 16, 20, 16, 20}},
    {{14, 18, 14, 18},{ 18, 23, 18, 23},{14, 18, 14, 18},{ 18, 23, 18, 23}},
    {{16, 20, 16, 20},{ 20, 25, 20, 25},{16, 20, 16, 20},{ 20, 25, 20, 25}},
    {{18, 23, 18, 23},{ 23, 29, 23, 29},{18, 23, 18, 23},{ 23, 29, 23, 29}}
}.
```

Six exemplary 8×8 de-quantization coefficient tables "8×8_dequant_coef[0]" to "8×8_dequant_coef[5]" in a three-dimensional data array are shown in the following:
const int dequant_coef8[6][8][8]=

```
{
    {
        { 20, 19, 25, 19, 20, 19, 25, 19},
        { 19, 18, 24, 18, 19, 18, 24, 18},
        { 25, 24, 32, 24, 25, 24, 32, 24},
        { 19, 18, 24, 18, 19, 18, 24, 18},
        { 20, 19, 25, 19, 20, 19, 25, 19},
        { 19, 18, 24, 18, 19, 18, 24, 18},
        { 25, 24, 32, 24, 25, 24, 32, 24},
        { 19, 18, 24, 18, 19, 18, 24, 18}
    },
    {
```

-continued

```
        { 22, 21, 28, 21, 22, 21, 28, 21},
        { 21, 19, 26, 19, 21, 19, 26, 19},
        { 28, 26, 35, 26, 28, 26, 35, 26},
        { 21, 19, 26, 19, 21, 19, 26, 19},
        { 22, 21, 28, 21, 22, 21, 28, 21},
        { 21, 19, 26, 19, 21, 19, 26, 19},
        { 28, 26, 35, 26, 28, 26, 35, 26},
        { 21, 19, 26, 19, 21, 19, 26, 19}
    },
    {
        { 26, 24, 33, 24, 26, 24, 33, 24},
        { 24, 23, 31, 23, 24, 23, 31, 23},
        { 33, 31, 42, 31, 33, 31, 42, 31},
        { 24, 23, 31, 23, 24, 23, 31, 23},
        { 26, 24, 33, 24, 26, 24, 33, 24},
        { 24, 23, 31, 23, 24, 23, 31, 23},
        { 33, 31, 42, 31, 33, 31, 42, 31},
        { 24, 23, 31, 23, 24, 23, 31, 23}
    },
    {
        { 28, 26, 35, 26, 28, 26, 35, 26},
        { 26, 25, 33, 25, 26, 25, 33, 25},
        { 35, 33, 45, 33, 35, 33, 45, 33},
        { 26, 25, 33, 25, 26, 25, 33, 25},
        { 28, 26, 35, 26, 28, 26, 35, 26},
        { 26, 25, 33, 25, 26, 25, 33, 25},
        { 35, 33, 45, 33, 35, 33, 45, 33},
        { 26, 25, 33, 25, 26, 25, 33, 25}
    },
    {
        { 32, 30, 40, 30, 32, 30, 40, 30},
        { 30, 28, 38, 28, 30, 28, 38, 28},
        { 40, 38, 51, 38, 40, 38, 51, 38},
        { 30, 28, 38, 28, 30, 28, 38, 28},
        { 32, 30, 40, 30, 32, 30, 40, 30},
        { 30, 28, 38, 28, 30, 28, 38, 28},
        { 40, 38, 51, 38, 40, 38, 51, 38},
        { 30, 28, 38, 28, 30, 28, 38, 28}
    },
    {
        { 36, 34, 46, 34, 36, 34, 46, 34},
        { 34, 32, 43, 32, 34, 32, 43, 32},
        { 46, 43, 58, 43, 46, 43, 58, 43},
        { 34, 32, 43, 32, 34, 32, 43, 32},
        { 36, 34, 46, 34, 36, 34, 46, 34},
        { 34, 32, 43, 32, 34, 32, 43, 32},
        { 46, 43, 58, 43, 46, 43, 58, 43},
        { 34, 32, 43, 32, 34, 32, 43, 32}
    }
}.
```

Figure 4:
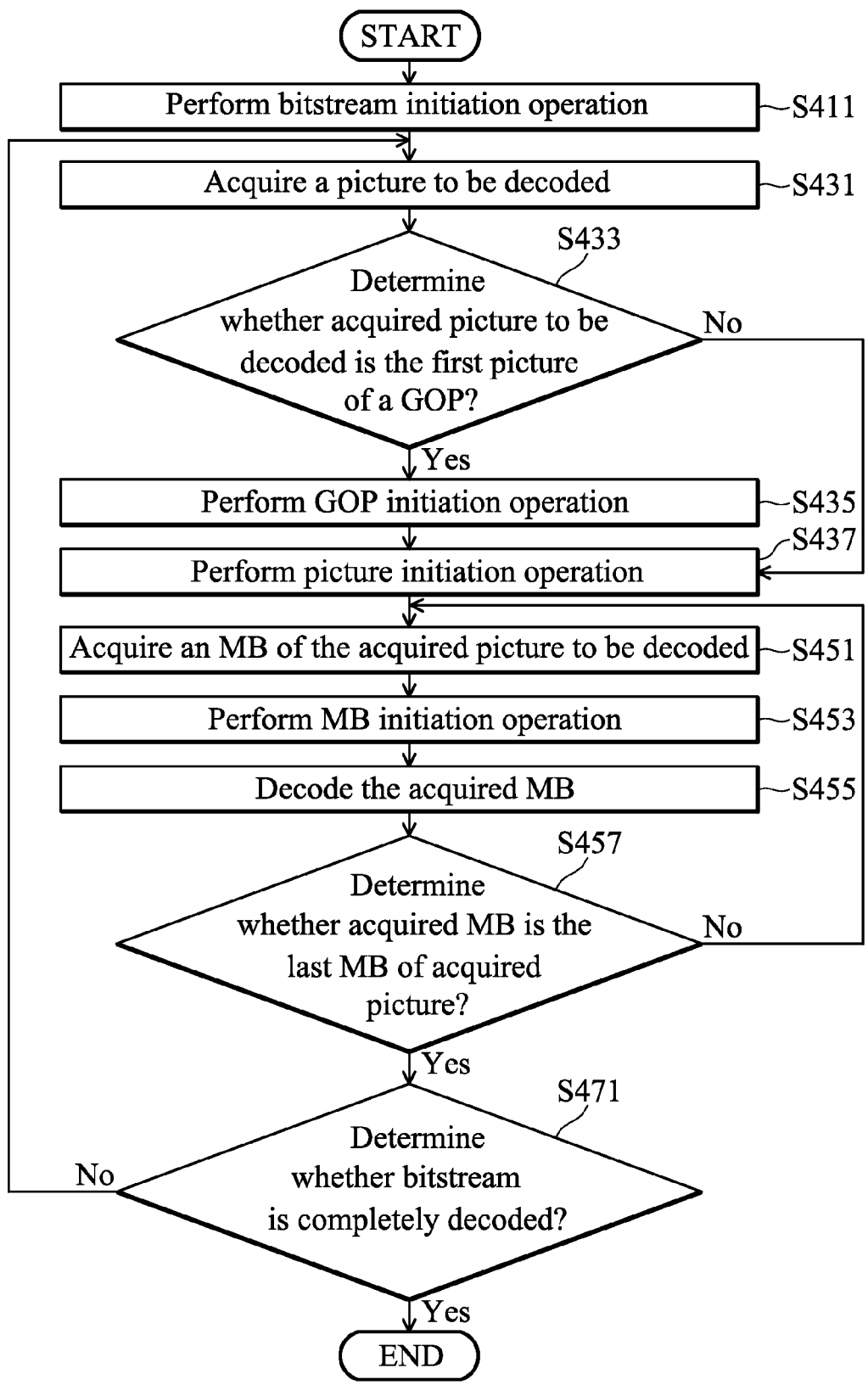
FIG. 4 is a flowchart illustrating an embodiment of a method for bitstream decoding.

FIG. 4 is a flowchart illustrating an embodiment of a method for bitstream decoding, performed in a general-purpose processor (not shown) or a video decoding engine (such as dedicated hardware circuits, 230 of FIG. 2). Although the disclosure takes H.26x as examples, it is to be understood that the embodiments of the invention described hereinafter may also apply to MPEG, VC-1, VP-6, or others without departure of the spirit of invention. In step S411, a bitstream initiation operation is performed. Relevant de-quantization coefficient tables, quantization matrices, and/or de-quantization tables may be prepared and stored in an external storage (e.g. 330 of FIG. 3), and/or a local storage (e.g. 311 of FIG. 3) with reference to the flags, such as seq_scaling_matrix_present_flag and seq_scaling_list_present_flag[i], for i=0 . . . 7, in the sequence header. In step S431, a picture to be decoded is acquired. In step S433, it is determined whether the acquired picture to be decoded is the first picture of a GOP. If so, the process proceeds to step S435, otherwise, to step S437. In step S435, a GOP initiation operation is performed. In step S437, a picture initiation operation is performed for decoding of the acquired picture. Relevant de-quantization coefficient tables, quantization matrices, and de-quantization tables may be prepared and stored in an external storage (e.g. 330 of FIG.

3), and a local storage (e.g. 311 of FIG. 3) with reference to the flags, such as pic_scaling_matrix_present_flag and pic_scaling_list_present_flag[i], for i=0 . . . 7, in the picture header.

In step S451, an MB of the acquired picture to be decoded is acquired. In step S453, an MB initiation operation for all MBs of the acquired picture to be decoded is performed. Relevant de-quantization coefficient tables, quantization matrices, and/or de-quantization tables may be provided. The providing may contain generation of the de-quantization coefficient tables, quantization matrices, and/or de-quantization tables, and storing to an external storage (e.g. 330 of FIG. 3), and/or a local storage (e.g. 311 of FIG. 3) with reference to the flags, such as seq_scaling_matrix_present_flag or pic_scaling_matrix_present_flag, and seq_scaling_list_present_flag[i] or pic_scaling_list_present_flag[i], for i=0 . . . 7, in the sequence header, picture header, or a header of sequence, slice, picture, GOP or MB layer. That is, the generation may be performed in MB level. Otherwise, the generation and storage of the de-quantization coefficient tables, quantization matrices, and/or de-quantization tables may be performed in sequence level, picture level (e.g. step S437), GOP level (e.g. step S435) or slice level. The providing may contain retrieving from the external storage (e.g. 330 of FIG. 3), and/or a local storage (e.g. 311 of FIG. 3). In step S455, the acquired MB undergoes entropy decoding, de-quantization, IDCT, motion compensation and post-processing as shown in FIG. 2. When de-quantizing a block of the acquired MB, such as 4×4 Y, Cb or Cr intra or inter block, or 8×8 Y intra or inter block, one of the stored de-quantization tables is determined to be provided. When the acquired MB comprises Y, Cb and Cr blocks to be de-quantized, three de-quantization tables for Y, Cb and Cr blocks are required. Determination details of de-quantization tables in various aspects are described in the following.

In step S457, it is determined whether the acquired MB is the last MB of the acquired picture. If so, the process proceeds to step S471, otherwise, to step S451 to decode the next MB. In step S471, it is determined whether the bitstream is completely decoded. If so, the entire process ends, otherwise, the process proceeds to step S431 to decode the next picture.

Figure 5A:
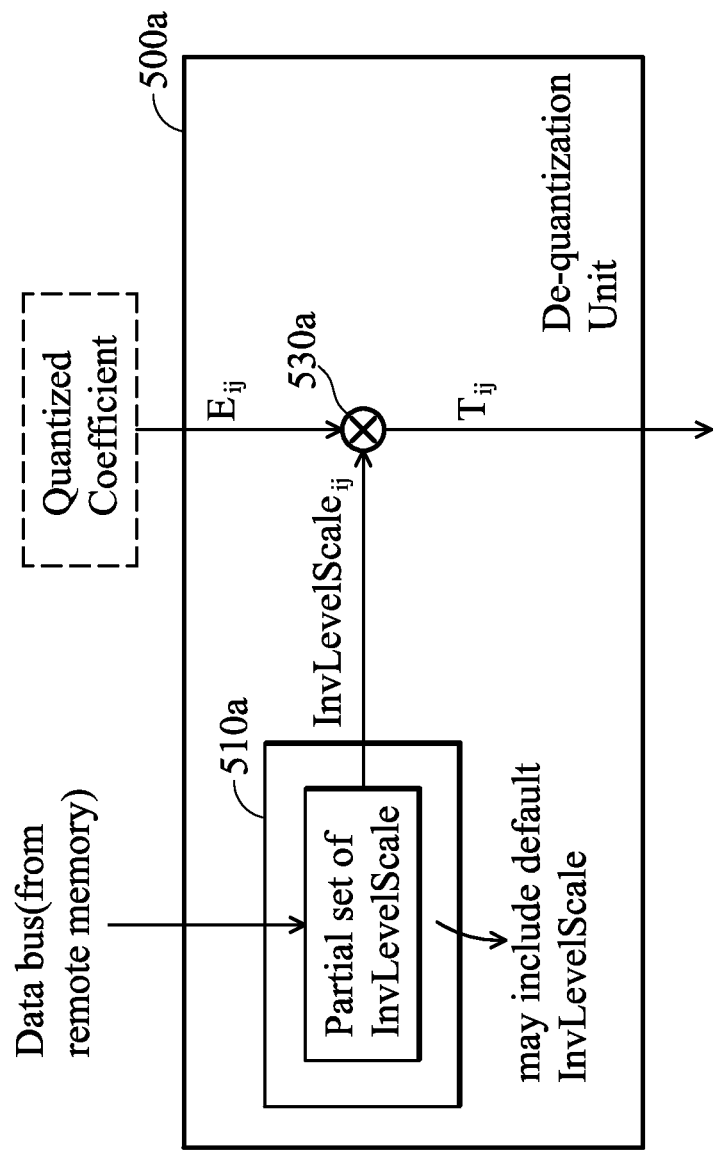
FIGS. 5a, 6a, 7a, 8a, 9a, 10a, 11a and 12a are diagrams of embodiments of de-quantization units.

In a first embodiment, an exemplary de-quantization unit 500a as shown in FIG. 5a comprises a local storage 510a, such as an SRAM or register, and a multiplier 530a. The q-matrices[0 . . . 7] for the entire bitstream or a single picture are generated, and subsequently, all necessary de-quantization tables are prepared based on the generated q-matrices [0 . . . 7], and stored in an external storage, such as 330 of FIG. 3, before de-quantizing Y, Cb and Cr blocks of MBs. In an example, in step S437 of FIG. 4, the q-matrices[0 . . . 7] for the entire bitstream are generated with reference to the flags seq_scaling_matrix_present_flag and seq_scaling_list_present_flag[i], for i=0 . . . 7. In another example, in step S437 of FIG. 4, the q-matrix [0 . . . 7] for a single picture are generated with reference to the flags pic_scaling_matrix_present_flag and pic_scaling_list_present_flag[i], for i=0 . . . 7. All necessary de-quantization tables for 4×4 blocks may be calculated by exemplary pseudo code as shown below.

```
for (k=0; k<6; k++)
  for (j=0; j<4; j++)
    for (i=0; i<4; i++)
    {
      temp = (i<<2) + j;
      InvLevelScale[0][k][j][i] = dequant_coef[k][j][i] × q-matrix[0][temp];
```

```
      InvLevelScale[1][k][j][i] = dequant_coef[k][j][i] × q-matrix[1][temp];
      InvLevelScale[2][k][j][i] = dequant_coef[k][j][i] × q-matrix[2][temp];
      InvLevelScale[3][k][j][i] = dequant_coef[k][j][i] × q-matrix[3][temp];
      InvLevelScale[4][k][j][i] = dequant_coef[k][j][i] × q-matrix[4][temp];
      InvLevelScale[5][k][j][i] =
        dequant_coef[k][j][i] × q-matrix[5][temp];}
```

Where q-matrix[0] to q-matrix[5] represent the first to six-th generated q-matrices respectively; dequant_coef[k] represents the k-th predefined 4×4 de-quantization coefficient tables; InvLevelScale[0] collectively represents six de-quantization tables for de-quantizing 4×4 intra Y MBs; InvLevelScale[1] collectively represents six de-quantization tables for de-quantizing 4×4 intra Cb MBs; InvLevelScale[2] collectively represents six de-quantization tables for de-quantizing 4×4 intra Cr MBs; InvLevelScale[3] collectively represents six de-quantization tables for de-quantizing 4×4 inter Y MBs; InvLevelScale[4] collectively represents six de-quantization tables for de-quantizing 4×4 inter Cb MBs; and InvLevelScale[5] collectively represents six de-quantization tables for de-quantizing 4×4 inter Cr MBs. All necessary de-quantization tables for 8×8 blocks may be calculated by exemplary pseudo code as shown below.

```
for (k=0; k<6; k++)
  for (j=0; j<8; j++)
    for (i=0; i<8; i++)
    {
      temp = (i<<3) + j;
      InvLevelScale8[0][k][j][i] =
        8×8_dequant_coef[k][j][i] × q-matrix[6][temp];
      InvLevelScale8[1][k][j][i] =
        8×8_dequant_coef[k][j][i] × q-matrix[7][temp];}
```

Where q-matrix[6] to q-matrix[7] represents the 7-th to 8-th generated q-matrices respectively, 8×8_dequant_coef[k] represents the k-th predefined 8×8 de-quantization coefficient tables, InvLevelScale8[0] collectively represents six de-quantization tables for de-quantizing 8×8 intra Y MBs, and InvLevelScale8[1] collectively represents six de-quantization tables for de-quantizing 8×8 inter Y MBs. When decoding a particular MB as shown in step S455 of FIG. 4, types of the MB, such as 4×4 or 8×8, and intra or inter, are recognized, at least one set of the de-quantization tables (e.g. InvLevelScale[0][k] to InvLevelScale[2][k] for 4×4 Intra MB, InvLevelScale8[0][k] for 8×8 Intra MB, or others, where k=0 . . . 5) for the recognized types are acquired, and finally, one de-quantization table is acquired from each set of the de-quantization tables of the external storage based on a quantization parameter (QP), and stored in the local storage 510a.

The QP value may be determined by exemplary pseudo code during quantization of an MB, as shown in the following.

```
Function qp_calc( ) {
  img->qp= (( img->qp + currMB->delta_quant + 52 +
      2*img->bitdepth_luma_qp_scale
      )%(52+img->bitdepth_luma_qp_scale)
      ) - img->bitdepth_luma_qp_scale;
  int qp_per  = (img->qp + img->bitdepth_luma_qp_scale -
      MIN_QP)/6;
  int qp_rem  = (img->qp + img->bitdepth_luma_qp_scale -
      MIN_QP)%6;
```

-continued

```
qp_uv[i] = img->qp + dec_picture->chroma_qp_offset[i];
qp_uv[i] = Clip3(-(img->bitdepth_chroma_qp_scale), 51, qp_uv[i]);
qp_c[i] = (qp_uv[i] < 0)? qp_uv[i] :
QP_SCALE_CR[qp_uv[i]-MIN_QP];
qp_per_uv[i] = (qp_c[i] + img->bitdepth_chroma_qp_scale)/6;
qp_rem_uv[i] = (qp_c[i] + img->bitdepth_chroma_qp_scale)%6; }
```

For example, when de-quantizing an intra-coded MB comprising four 4×4 Y blocks, one 4×4 Cb block, and one 4×4 Cr block, a QP "qp_rem" ranging from 0 to 5 is utilized to determine one of the InvLevelScale[0][0 . . . 5], a QP "qp_rem_uv[0]" ranging from 0 to 5 is utilized to determine one of the InvLevelScale[1][0 . . . 5], and a QP "qp_rem_uv[1]" ranging from 0 to 5 is utilized to determine one of the InvLevelScale[2][0 . . . 5]. Note that an MB may contain only Y blocks when the content of the MB is monochromatic. The multiplier 530a subsequently generates an inverse quantized coefficient $T_{ij}$ by multiplying a de-quantization scale InvLevelScale$_{ij}$ by a quantized coefficient $E_{ij}$, where $T_{ij}$ represents an inverse quantized coefficient of row i of column j of the currently processed block, $E_{ij}$ represents a quantized coefficient of row i of column j of the currently processed block, which is transformed by the entropy decoding, or both the entropy decoding and Hadamard transform, and InvLevelScale$_{ij}$ represents a de-quantization scale of row i of column j of a de-quantization table.

Figure 5B:
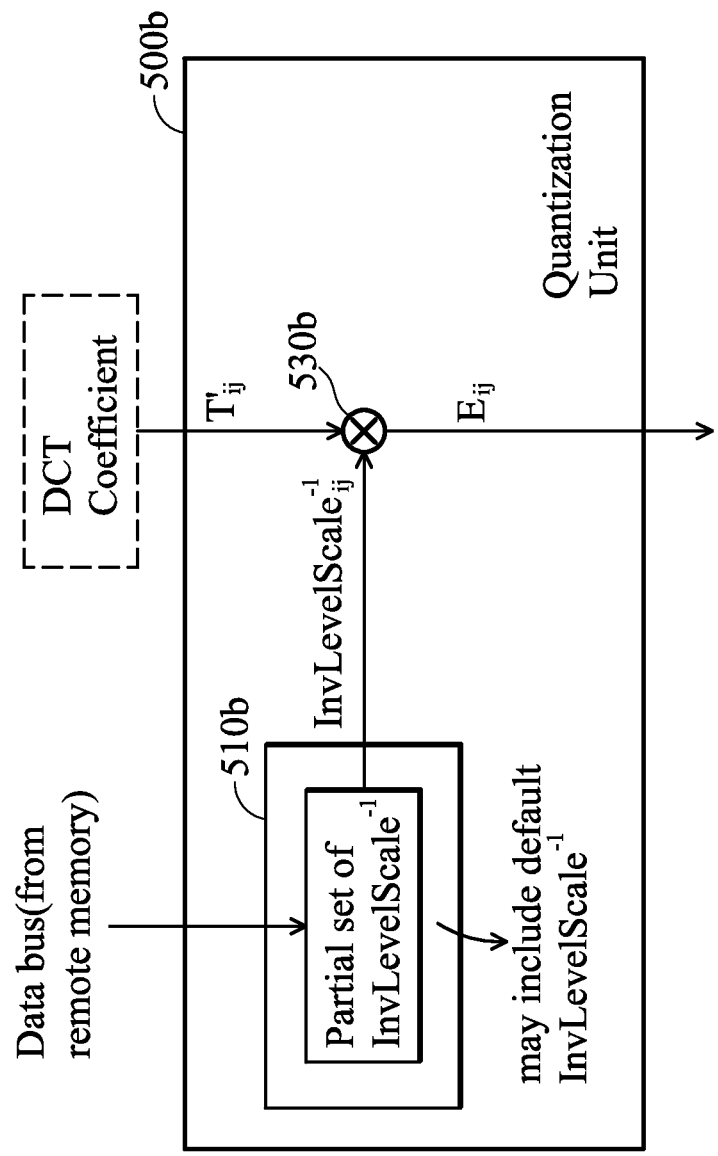
FIGS. 5b, 6b, 7b, 8b, 9b, 10b, 11b and 12b are diagrams of embodiments of quantization units.

A quantization unit can be deduced by analogy because the de-quantization is the reverse operation of the quantization. FIG. 5b is a diagram of an exemplary quantization unit 500b comprising a local storage 510b, such as an SRAM or register, and a multiplier 530b. The local storage 510b may store three quantization tables each comprising ixj InvLevelScale$^{-1}$ (i.e. quantization scale) before quantizing Y, Cb and Cr blocks of an MB, each InvLevelScale$^{-1}$ is the inverse of InvLevelScale. It is to be understood that the inverse of InvLevelScale may not be limited to 1/InvLevelScale, and the relationship between the InvLevelScale and the inverse thereof is predefined and may refer to any relevant specification known by those skilled in the art. The definition of the inverse of InvLevelScale may also apply to the other embodiments. The multiplier 530b generates a quantized coefficient $E_{ij}$ by multiplying a quantization scale InvLevelScale$_{ij}^{-1}$ by a transformed coefficient $T'_{ij}$, where $E_{ij}$ represents a quantized coefficient of row i of column j of the currently processed block, $T'_{ij}$ represents a transformed coefficient of row i of column j of the currently processed block, which is transformed by the DCT, and InvLevelScale$_{ij}^{-1}$ represents a quantization scale of row i of column j of a quantization table.

Figure 6A:
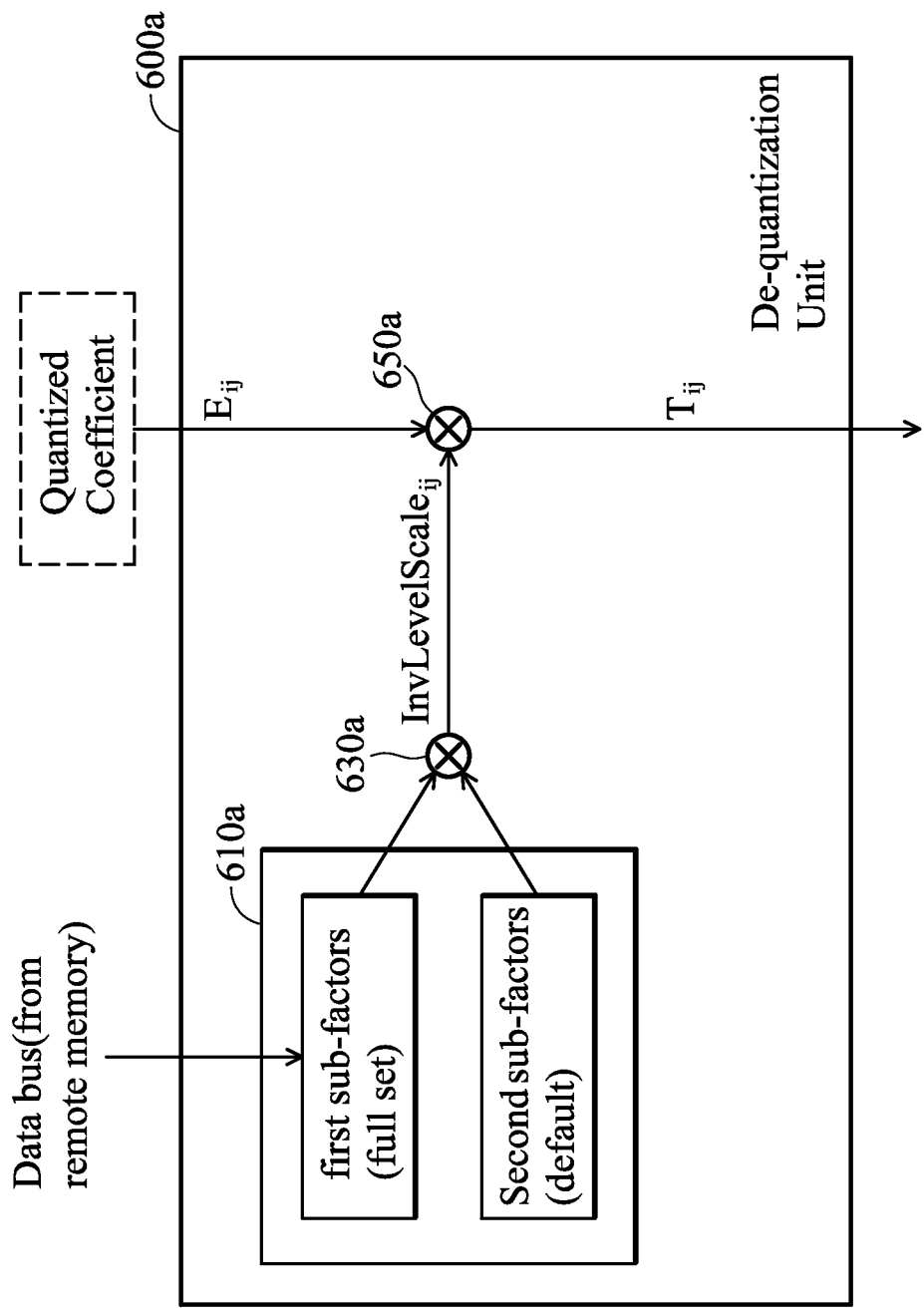

In another embodiment, an exemplary de-quantization unit 600a as shown in FIG. 6a comprises a local storage 610a, such as an SRAM or register, and two multipliers 630a and 650a. The local storage 610a initially stores second sub-factors (e.g. de-quantization coefficient tables including the dequant_coef[0 . . . 5] and 8×8_dequant_coef[0 . . . 5]). It is to be understood that the second sub-factors being default sub-factors may be stored in a read-only memory (ROM) table. All first sub-factors (e.g. all default quantization matrices comprising the quant_org, quant8_org, quant_intra_default, quant_inter_default, quant8_intra_default and quant8_inter_default, and user-defined quantization matrices comprising the ScalingList4×4[0 . . . 5] and ScalingList8×8 [0 . . . 1]) are stored in the local storage 610a before de-quantizing Y, Cb and Cr blocks of MBs. When decoding a particular block of MB as shown in step S455 of FIG. 4, the block type of the MB, such as a 4×4 or 8×8 block, an intra or inter block, and a Y, Cb or Cr block, is recognized, flags seq_scaling_matrix_present_flag and seq_scaling_list_present_flag[i], or pic_scaling_matrix_present_flag and pic_scaling_list_present_flag[i] for i=0 . . . 7 are acquired from the video sequence header, the picture header, or a header of sequence, slice, picture, GOP or MB layer, a relevant quantization matrix is acquired from the local storage 610a with reference to the recognized block type and the acquired flags, and a particular de-quantization coefficient table is acquired from the local storage 610a based on a quantization parameter (QP) value and the recognized block type. The details of the QP may follow the description of the first embodiment. The multiplier 630a generates a de-quantization scale InvLevelScale$_{ij}$ by multiplying a de-quantization coefficient dequant$_{ij}$ by a quantization matrix value q-matrix$_{ij}$, where InvLevelScale$_{ij}$ represents a de-quantization scale of row i of column j of a de-quantization table, dequant$_{ij}$ represents a value of row i of column j of the acquired quantization coefficient table, and q-matrix$_{ij}$ represents a value of row i of column j of the acquired quantization matrix. The multiplier 650a generates an inverse quantized coefficient $T_{ij}$ by multiplying a de-quantization scale InvLevelScale$_{ij}$ by a quantized coefficient $E_{ij}$, where $T_{ij}$ represents an inverse quantized coefficient of row i of column j of the currently processed block, $E_{ij}$ represents a quantized coefficient of row i of column j of the currently processed block, which is transformed by the entropy decoding, or both the entropy decoding and Hadamard transform, and InvLevelScale$_{ij}$ represents the generated de-quantization scale of row i of column j of a de-quantization table.

Figure 6B:
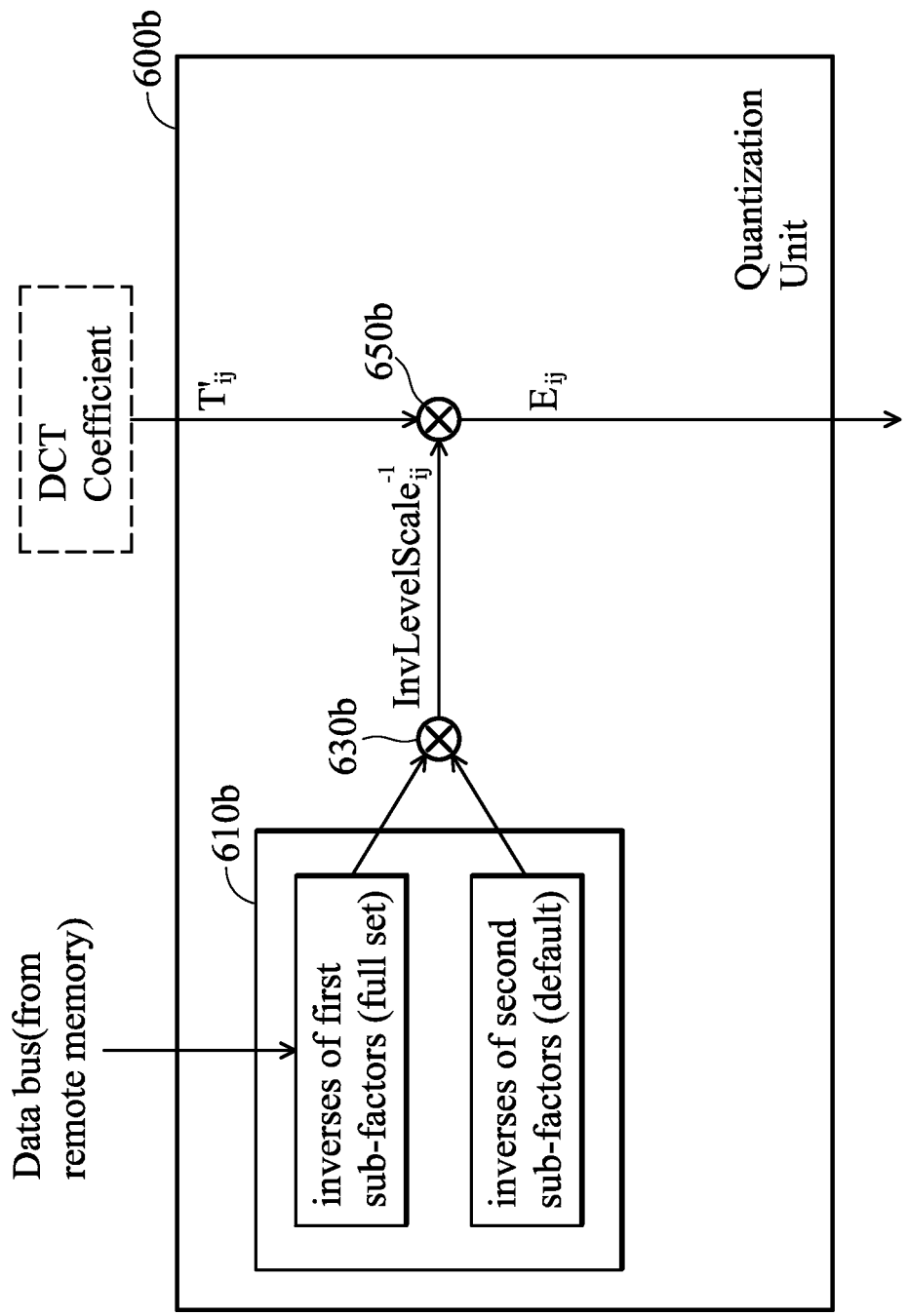

A quantization unit can be deduced by analogy because the de-quantization is the reverse operation of the quantization. FIG. 6b is a diagram of an exemplary quantization unit 600b comprising a local storage 610b, such as an SRAM or register, and two multipliers 630b and 650b. The local storage 610b initially stores the inverse of second sub-factors. It is to be understood that the inverse of second sub-factors may be initially stored in a ROM table. All the inverses of the first sub-factors are stored in the local storage 610b before quantizing Y, Cb and Cr blocks of MBs. When encoding a particular block of MB, the multiplier 630b generates a quantization scale InvLevelScale$_{ij}^{-1}$ by multiplying the inverse of a first sub-factor (e.g. the inverse of a quantization matrix value, 1/q-matrix$_{ij}$) by the inverse of a second sub-factor (e.g. the inverse of a de-quantization coefficient, 1/dequant$_{ij}$), where InvLevelScale$_{ij}^{-1}$ represents the inverse of a de-quantization scale of row i of column j of a de-quantization table, dequant$_{ij}$ represents a value of row i of column j of a quantization coefficient table, and q-matrix$_{ij}$ represents a value of row i of column j of a quantization matrix. The multiplier 650b generates a quantized coefficient $E_{ij}$ by multiplying a quantization scale InvLevelScale$_{ij}^{-1}$ by a transformed coefficient $T'_{ij}$, where $E_{ij}$ represents a quantized coefficient of row i of column j of the currently processed block, $T'_{ij}$ represents a transformed coefficient of row i of column j of the currently processed block, which is transformed by the DCT, and InvLevelScale$_{ij}^{-1}$ represents a quantization scale of row i of column j of a quantization table.

Figure 7A:
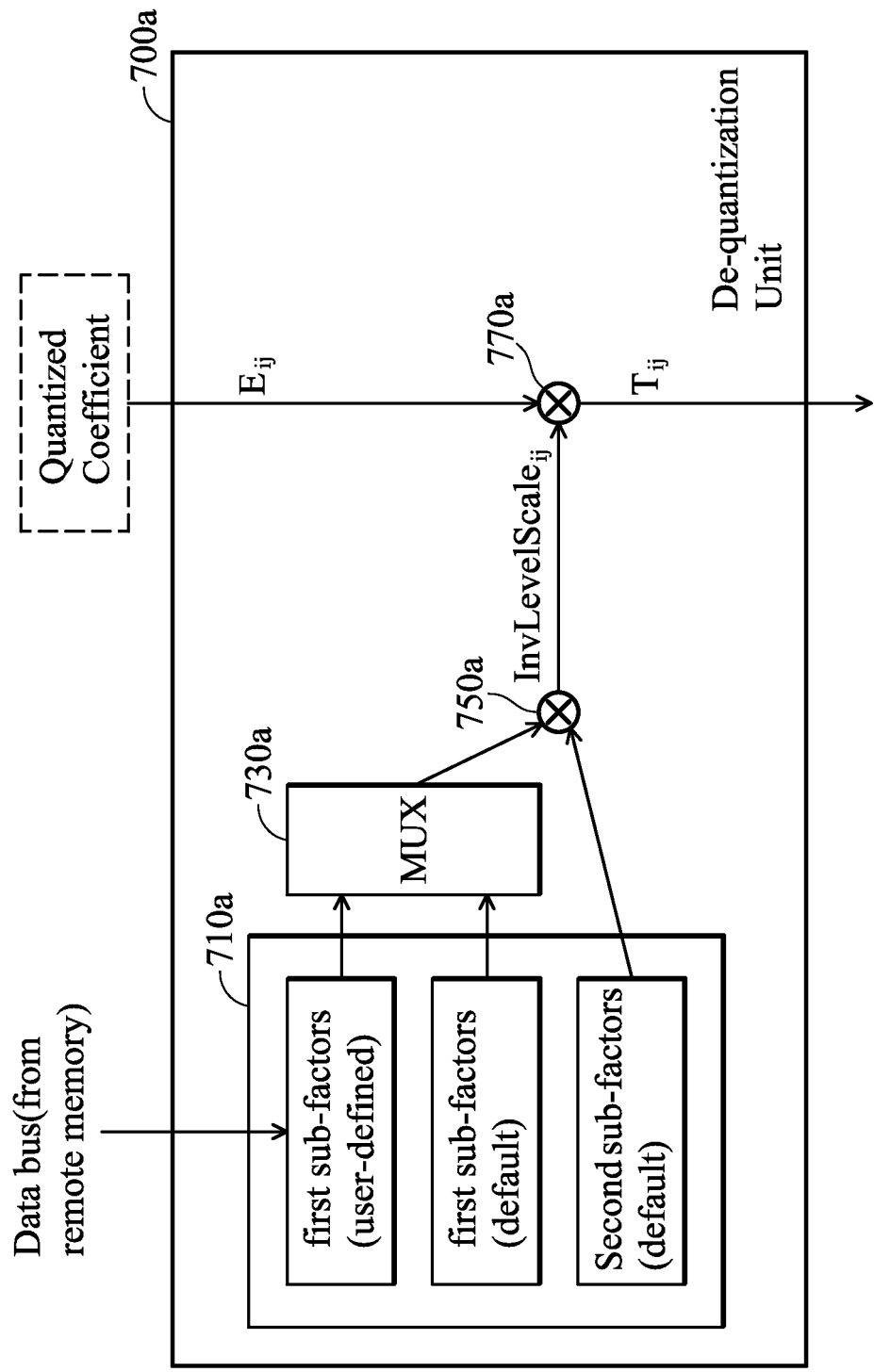

In a third embodiment, an exemplary de-quantization unit 700a as shown in FIG. 7a comprises a local storage 710a, such as an SRAM or register, a multiplexer 730a and two multipliers 750a and 770a. The local storage 710a initially stores first default sub-factors (e.g. quantization matrices including the quant_org, quant8_org, quant_intra_default, quant_inter_default, quant8_intra_default and quant8_inter_default) and second sub-factors (e.g. de-quantization coefficient tables including the dequant_coef[0 . . . 5]

and 8×8_dequant_coef[0 . . . 5]). It is to be understood that the first default sub-factors and second sub-factors may be stored in ROM tables. All first user-defined sub-factors (e.g. user-defined q-matrices comprising the ScalingList4×4[0'5] and ScalingList8×8[0 . . . 1]) are stored in the local storage 710a before de-quantizing Y, Cb and Or blocks of MBs. When decoding a particular block of MB as shown in step S455 of FIG. 4, flags seq_scaling_matrix_present_flag and seq_scaling_list_present_flag[i], or pic_scaling_matrix_present_flag and pic_scaling_list_present_flag[i] for i=0 . . . 7 are acquired from the video sequence header, the picture header, or a header of sequence, slice, picture, GOP or MB layer, and the multiplexer 730a accordingly outputs a user-defined or default quantization matrix to the multiplier 750a. And subsequently, the type of the block of the MB, such as a 4×4 or 8×8 block, an intra or inter block, and a Y, Cb or Or block, is recognized, a relevant quantization matrix is acquired through the multiplexer 730a with reference to the recognized block type and the acquired flags, and a particular de-quantization coefficient table is acquired from the local storage 710a based on a quantization parameter (QP) value and the recognized block type. The details of the QP may follow the description of the first embodiment. The multiplier 750a generates a de-quantization scale $InvLevelScale_{ij}$ by multiplying a de-quantization coefficient $dequant_{ij}$ by a quantization matrix value $q\text{-matrix}_{ij}$, where $InvLevelScale_{ij}$ represents a de-quantization scale of row i of column j of a de-quantization table, $dequant_{ij}$ represents a value of row i of column j of the acquired de-quantization coefficient table, and $q\text{-matrix}_{ij}$ represents a value of row i of column j of the acquired quantization matrix. The multiplier 770a generates an inverse quantized coefficient $T_{ij}$ by multiplying a de-quantization scale $InvLevelScale_{ij}$ by a quantized coefficient $E_{ij}$, where $T_{ij}$ represents an inverse quantized coefficient of row i of column j of the currently processed block, $E_{ij}$ represents a quantized coefficient of row i of column j of the currently processed block, which is transformed by the entropy decoding, or entropy decoding and the Hadamard transform, and $InvLevelScale_{ij}$ represents the generated de-quantization scale of row i of column j of a de-quantization table.

Figure 7B:
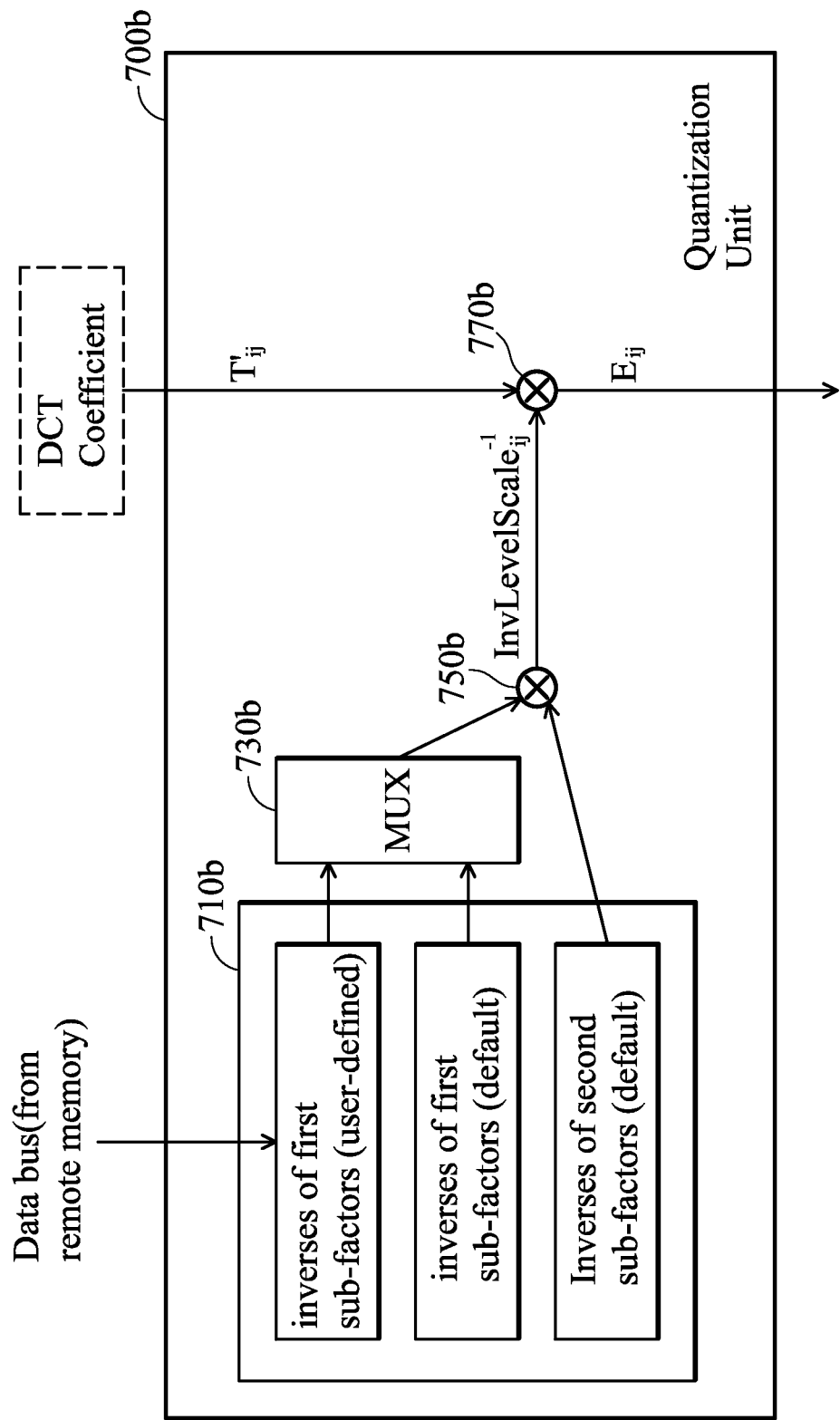

A quantization unit can be deduced by analogy because the de-quantization is the inverse operation of the quantization. FIG. 7b is a diagram of an exemplary quantization unit 700b comprising a local storage 710b, such as an SRAM or register, a multiplexer 730b, and two multipliers 750b and 770b. The local storage 710b initially stores the inverses of the first default sub-factors and the inverses of the second sub-factors. It is to be understood that the inverses of the first default sub-factors and the inverses of the second sub-factors may be initially stored in ROM tables. All the inverses of the first user-defined sub-factors are stored in the local storage 710b before quantizing Y, Cb and Cr blocks of MBs. When encoding a particular MB block, the multiplexer 730b outputs the inverse values of a user-defined or default quantization matrix to the multiplier 750b, and subsequently, the multiplier 750b generates a quantization scale $InvLevelScale_{ij}^{-1}$ by multiplying the inverse of a first sub-factor (e.g. the inverse of a quantization matrix value, $1/q\text{-matrix}_{ij}$) by the inverse of a second sub-factor (e.g. the inverse of a de-quantization coefficient, $1/dequant_{ij}$), where $InvLevelScale_{ij}^{-1}$ represents the inverse of a de-quantization scale of row i of column j of a de-quantization table, $dequant_{ij}$ represents a value of row i of column j of a quantization coefficient table, and q-matrix; represents a value of row i of column j of a quantization matrix. The multiplier 770b generates a quantized coefficient $E_{ij}$ by multiplying a quantization scale $InvLevelScale_{ij}^{-1}$ by a transformed coefficient $T'_{ij}$, where $E_{ij}$ represents a quantized coefficient of row i of column j of the currently processed block, $T'_{ij}$ represents a transformed coefficient of row i of column j of the currently processed block, which is transformed by the DCT, and $InvLevelScale_{ij}^{-1}$ represents a quantization scale of row i of column j of a quantization table.

Figure 8A:
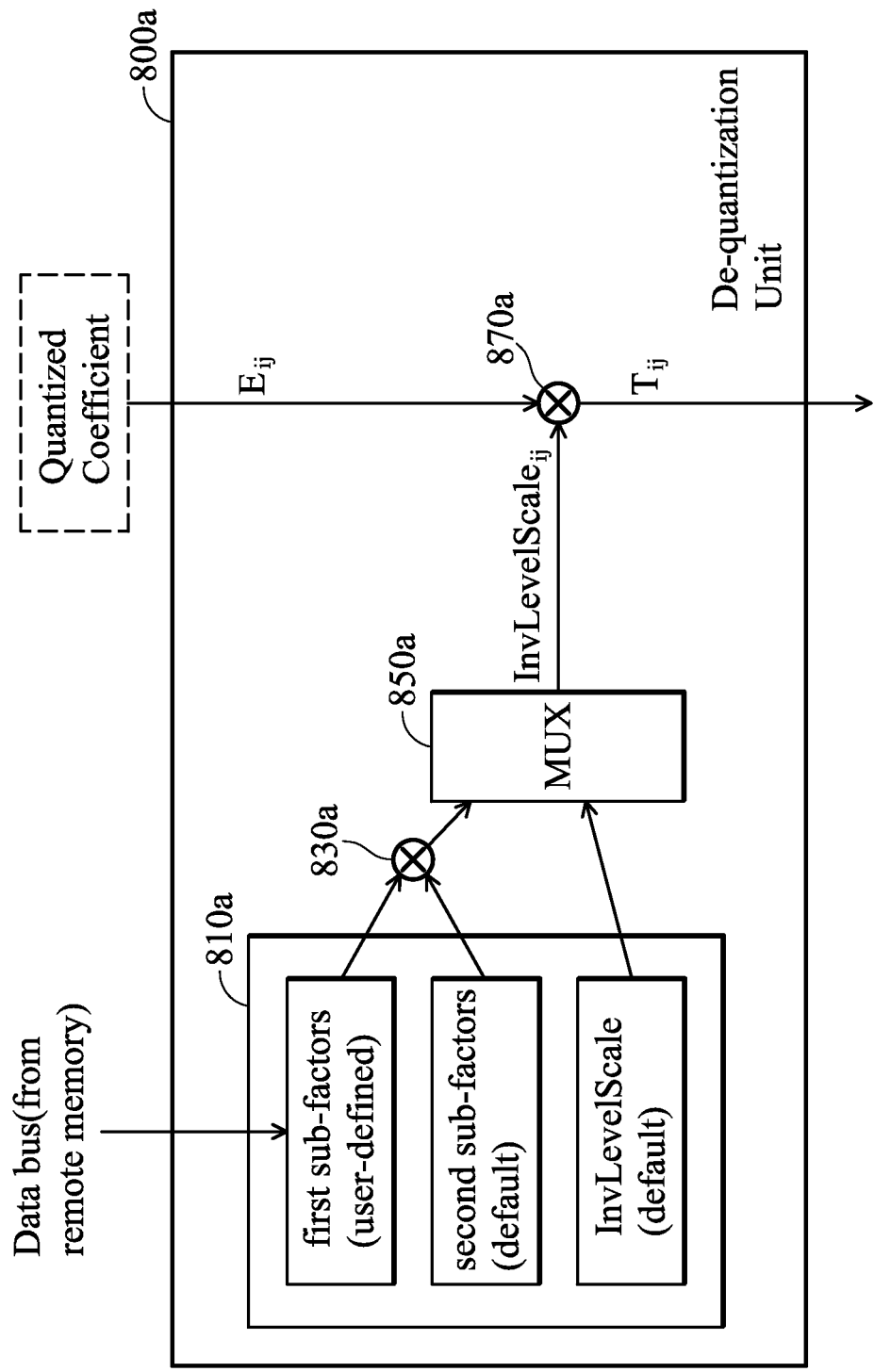

In a fourth embodiment, an exemplary de-quantization unit 800a as shown in FIG. 8a comprises a local storage 810a, such as an SRAM or register, a multiplexer 850a and two multipliers 830a and 870a. The local storage 810a initially stores second sub-factors (e.g. de-quantization coefficient tables including the dequant_coef[0 . . . 5] and 8×8_dequant_coef[0 . . . 5]) and default de-quantization tables. It is to be understood that the second sub-factors and default de-quantization tables may be stored in ROM tables. All default de-quantization tables for 4×4 blocks may be calculated by an exemplary formula shown in the following:

$$InvLevelScale[i][j] = dequant\_coef[j] \times q\text{-matrix}[i], \text{ for } i=0 \ldots 5 \text{ and } j=0 \ldots 5,$$

where q-matrix[i] represents the ith generated q-matrix, dequant_coef[j] represents the jth predefined 4×4 de-quantization coefficient tables, InvLevelScale[0][j] represents six de-quantization tables for de-quantizing 4×4 intra Y MBs, InvLevelScale[1][j] represents six de-quantization tables for de-quantizing 4×4 intra Cb MBs, InvLevelScale[2][j] represents six de-quantization tables for de-quantizing 4×4 intra Cr MBs, InvLevelScale[3][j] represents six de-quantization tables for de-quantizing 4×4 inter Y MBs, InvLevelScale[4][j] represents six de-quantization tables for de-quantizing 4×4 inter Cb MBs, and InvLevelScale[5][j] represents six de-quantization tables for de-quantizing 4×4 inter Cr MBs. The q-matrices[0 . . . 2] may be the quant_org or the quant_intra_default, and the q-matrices[3 . . . 5] may be the quant_org or the quant_inter_default. All default de-quantization tables for 8×8 blocks may be calculated by an exemplary formula shown in the following:

$$InvLevelScale[i][j] = 8 \times 8\_dequant\_coef[j] \times q\text{-matrix}[i], \text{ for } i=6 \ldots 7 \text{ and } j=0 \ldots 5,$$

where q-matrix [i] represents the ith generated q-matrix, 8×8_dequant_coef[j] represents the jth predefined 8×8 de-quantization coefficient tables, InvLevelScale[6][j] represents six de-quantization tables for de-quantizing 8×8 intra Y MBs, and InvLevelScale[7][j] represents six de-quantization tables for de-quantizing 8×8 inter Y MBs. The q-matrix[6] may be the quant8_org or the quant8_intra_default, and the q-matrix[7] may be the quant8_org or the quant8_inter_default. All first user-defined sub-factors (e.g. user-defined q-matrices comprising the ScalingList4×4[0 . . . 5] and ScalingList8×8[0 . . . 1]) are stored in the local storage 810a before de-quantizing Y, Cb and Cr blocks of MBs. When decoding a particular block of MB as shown in step S455 of FIG. 4, flags seq_scaling_matrix_present_flag and seq_scaling_list_present_flag[i], or pic_scaling_matrix_present_flag and pic_scaling_list_present_flag[i] for i=0 . . . 7 are acquired from the video sequence header, the picture header, or a header of sequence, slice, picture, GOP or MB layer, the type of the block of the MB, such as a 4×4 or 8×8 block, an intra or inter block, and a Y, Cb or Cr block, is recognized, a default de-quantization coefficient table and a user-defined de-quantization coefficient table are acquired from the local storage 810a based on the acquired flags, the recognized block type, and a quantization parameter (QP) value. The details of the QP may follow the description of the first embodiment. The multiplier 830a generates a user-defined de-quantization scale $InvLevelScale_{ij}$ by multiplying a de-quantization coefficient $dequant_{ij}$ by a quantization matrix value $q\text{-matrix}_{ij}$, where InvLevelScale$_{ij}$ represents a de-quantization scale of row i of column j of a user-defined de-quantization table, dequant$_{ij}$ represents a value of row i of column j of the acquired de-quantization coefficient table, and q-matrix; represents a value of row i of column j of the acquired quantization matrix. The multiplexer 850a outputs the multiply results (i.e. the user-defined de-quantization tables) or the default de-quantization tables to the multiplier 870a according to the acquired flags. The multiplier 870a generates an inverse quantized coefficient T$_{ij}$ by multiplying a de-quantization scale InvLevelScale$_{ij}$ by a quantized coefficient E$_{ij}$, where T$_{ij}$ represents an inverse quantized coefficient of row i of column j of the currently processed block, E$_{ij}$ represents a quantized coefficient of row of column j of the currently processed block, which is transformed by the entropy decoding, or entropy decoding and the Hadamard transform, and InvLevelScale$_{ij}$ represents the generated de-quantization scale of row i of column j of a de-quantization table.

Figure 8B:
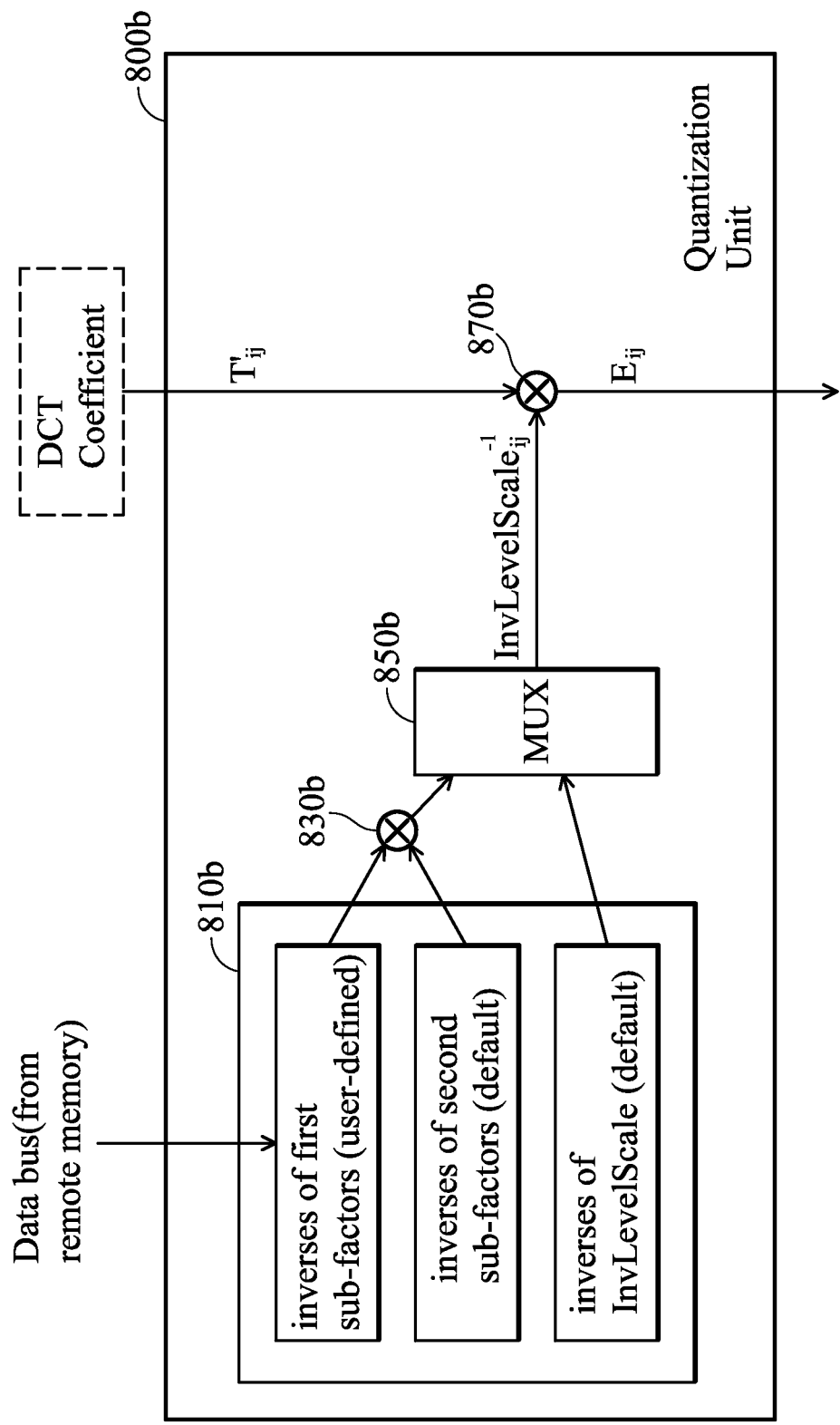

A quantization unit can be deduced by analogy because the de-quantization is the inverse operation of the quantization. FIG. 8b is a diagram of an exemplary quantization unit 800b comprising a local storage 810b, such as an SRAM or register, a multiplexer 850b, and two multipliers 830b and 870b. The local storage 810b initially stores the inverses of the default de-quantization scales and the inverses of the second sub-factors. It is to be understood that the inverses of the default de-quantization scales and the inverses of the second sub-factors may be initially stored in ROM tables. All the inverses of the first user-defined sub-factors are stored in the local storage 810b before quantizing Y, Cb and Cr blocks of MBs. When encoding a particular block of MB, the multiplier 830b generates the inverse of a user-defined de-quantization scale InvLevelScale$_{ij}^{-1}$ by multiplying the inverse of a de-quantization coefficient dequant$_{ij}^{-1}$ by the inverse of a quantization matrix value q-matrix$_{ij}^{-1}$, where InvLevelScale$_{ij}^{-1}$ represents the inverse of a de-quantization scale of row i of column j of a user-defined de-quantization table, dequant$_{ij}^{-1}$ represents the inverse value of row i of column j of a de-quantization coefficient table, and q-matrix$_{ij}^{-1}$ represents the inverse value of row i of column j of a user-defined quantization matrix. The multiplexer 850b outputs the multiply results (i.e. the user-defined quantization tables) or the default quantization tables. The multiplier 870b generates a quantized coefficient E$_{ij}$ by multiplying a quantization scale InvLevelScale$_{ij}^{-1}$ by a transformed coefficient T'$_{ij}$, where E$_{ij}$ represents a quantized coefficient of row i of column j of the currently processed block, T'$_{ij}$ represents a transformed coefficient of row i of column j of the currently processed block, which is transformed by the DCT, and InvLevelScale$_{ij}^{-1}$ represents a quantization scale of row i of column j of a quantization table.

Figure 9A:
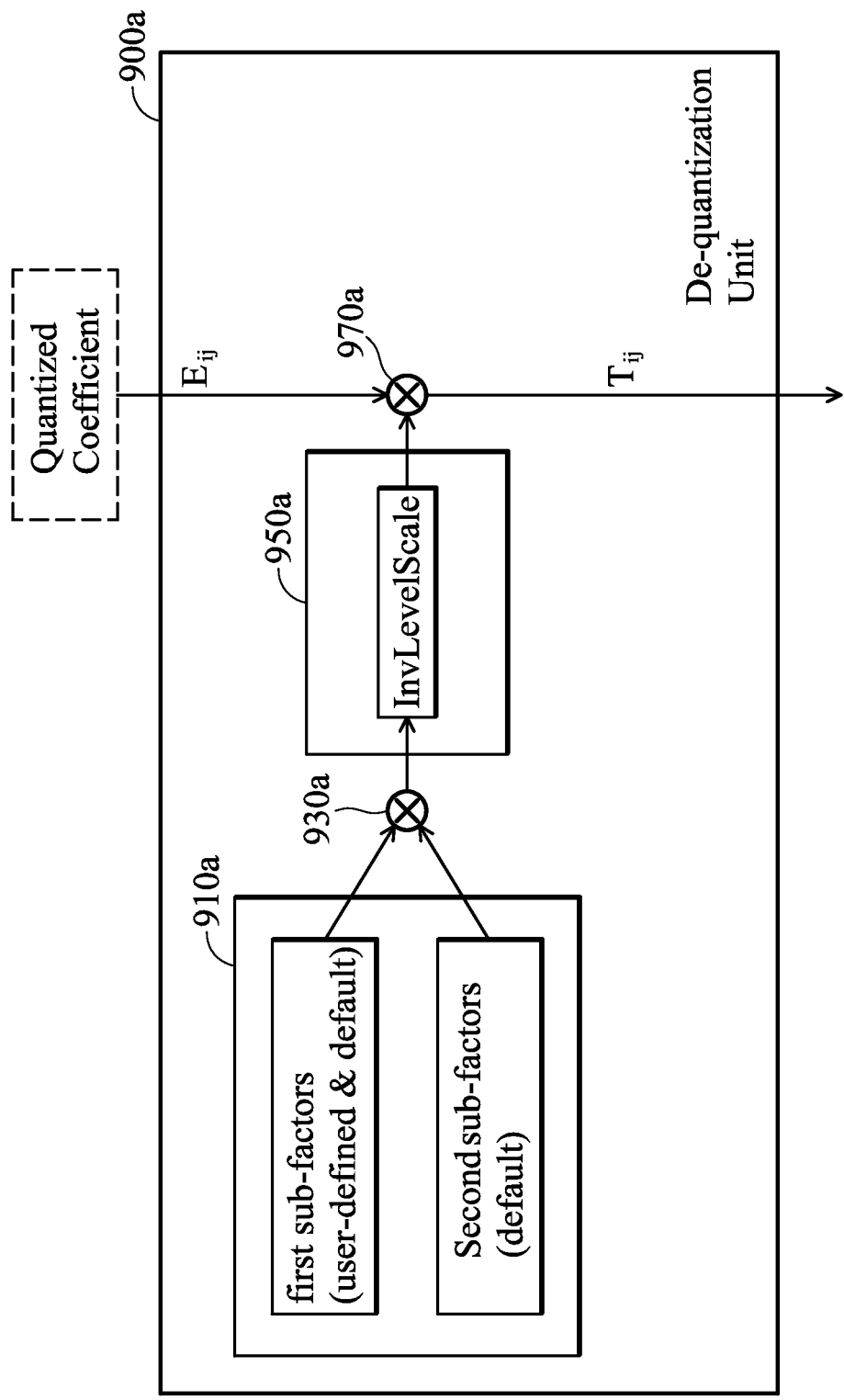

In a fifth embodiment, an exemplary de-quantization unit 900a as shown in FIG. 9a comprises a local storage 910a, such as an SRAM or register, a buffer 950a and two multipliers 930a and 970a. The local storage 910a initially stores all the first sub-factors (e.g. quant_org, quant8_org, quant_intra_default, quant_inter_default, quant8_intra_default, quant8_inter_default, ScalingList4×4[0 . . . 5] and ScalingList8×8[0 . . . 1]) and second sub-factors (e.g. de-quantization coefficient tables including the dequant_coef[0 . . . 5] and 8×8_dequant_coef[0 . . . 5]). It is to be understood that all the first sub-factors and the second sub-factors may be stored in ROM tables. Before de-quantizing a specific Y, Cb or Cr block of an MB (in step S455 of FIG. 4), flags seq_scaling_matrix_present_flag and seq_scaling_list_present_flag[i], or pic_scaling_matrix_present_flag and pic_scaling_list_present_flag[i] for i=0 . . . 7 are acquired from the video sequence header, the picture header, or a header of sequence, slice, picture, GOP or MB layer, and the type of the block of the MB, such as a 4×4 or 8×8 block, an intra or inter block, and a Y, Cb or Cr block, is recognized. At least one QP value for the acquired MB is determined. The details of the QP may follow the description of the first embodiment. A de-quantization table for the block to be decoded is generated and stored in the buffer 950a. Note that, when the de-quantization table stored in the buffer 950a can be employed in the block to be decoded, the de-quantization table may not be re-generated. The multiplier 930a generates a de-quantization scale InvLevelScale$_{ij}$ for a block to be decoded by multiplying a de-quantization coefficient dequant$_{ij}$ by a quantization matrix value q-matrix$_{ij}$, where InvLevelScale$_{ij}$ represents a de-quantization scale of row i of column j of a de-quantization table, dequant$_{ij}$ represents a value of row i of column j of a de-quantization coefficient table being selected based on the recognized block type and the QP value, and q-matrix; represents a value of row i of column j of the acquired quantization matrix being selected based on the acquired flags and the recognized block type. When decoding a particular block of MB as shown in step S455 of FIG. 4, the multiplier 970a generates an inverse quantized coefficient T$_{ij}$ by multiplying a de-quantization scale InvLevelScale$_{ij}$ from the buffer 950a by a quantized coefficient E$_{ij}$, where T$_{ij}$ represents an inverse quantized coefficient of row i of column j of the currently processed block, E$_{ij}$ represents a quantized coefficient of row i of column j of the currently processed block, which is transformed by the entropy decoding, or entropy decoding and the Hadamard transform, and InvLevelScale$_{ij}$ represents the stored de-quantization scale of row i of column j of a de-quantization table.

Figure 9B:
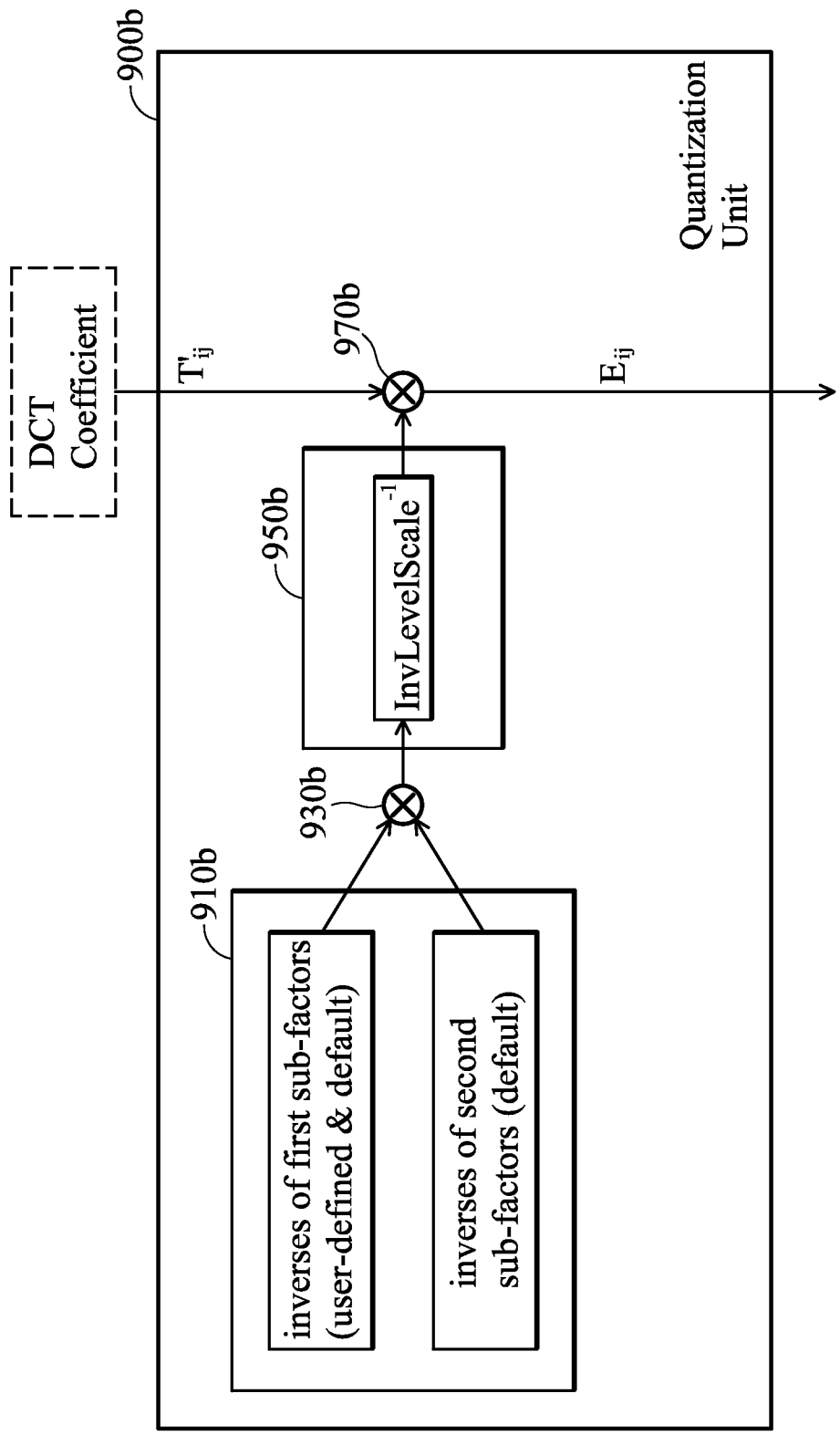

A quantization unit can be deduced by analogy because the de-quantization is the inverse operation of the quantization. FIG. 9b is a diagram of an exemplary quantization unit 900b comprising a local storage 910b, such as an SRAM or register, a buffer 950b, and two multipliers 930b and 970b. The local storage 910b initially stores the inverses of all the first sub-factors and second sub-factors. It is to be understood that the inverses of all the first sub-factors and second sub-factors may be initially stored in ROM tables. Before quantizing a specific Y, Cb and Cr block of an MB, a quantization table for a block to be encoded is generated and stored in the buffer 950b. Note that, when the quantization table stored in the buffer 950b can be employed in the block to be encoded, the quantization table may not be re-generated. The multiplier 930b generates the inverse of a de-quantization scale InvLevelScale$_{ij}^{-1}$ by multiplying the inverse of a de-quantization coefficient dequant$_{ij}^{-1}$ by the inverse of a quantization matrix value q-matrix$_{ij}^{-1}$, where InvLevelScale$_{ij}^{-1}$ represents the inverse of a de-quantization scale of row i of column j of a de-quantization table, dequant$_{ij}^{-1}$ represents the inverse value of row i of column j of a de-quantization coefficient table for the block to be encoded, and q-matrix$_{ij}^{-1}$ represents the inverse value of row i of column j of a quantization matrix for the block to be encoded. When encoding a particular block of MB, the multiplier 970b generates a quantized coefficient E$_{ij}$ by multiplying a quantization scale InvLevelScale$_{ij}^{-1}$ by a transformed coefficient T'$_{ij}$, where E$_{ij}$ represents a quantized coefficient of row i of column j of the currently processed block, T'$_{ij}$ represents a transformed coefficient of row i of column j of the currently processed block, which is transformed by the DCT, and InvLevelScale$_{ij}^{-1}$ represents a stored quantization scale of row i of column j of a quantization table.

Figure 10A:
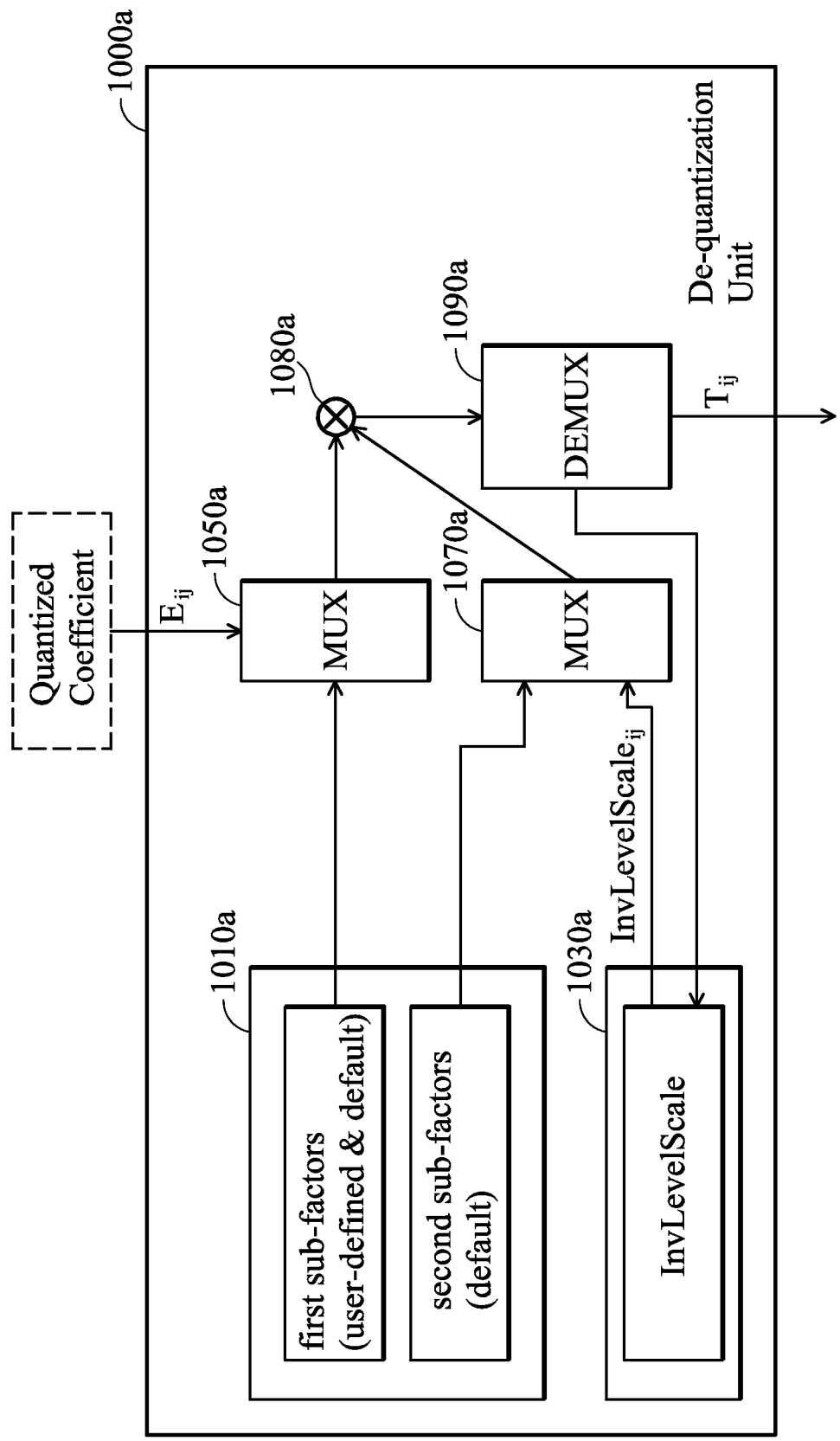

In a sixth embodiment, an exemplary de-quantization unit 1000a as shown in FIG. 10a comprises a local storage 1010a, such as an SRAM or register, a buffer 1030a, two multiplexers 1050a and 1070a, a multiplier 1080a and a de-multiplexer 1090a. The local storage 1010a initially stores all the first sub-factors (e.g. quant_org, quant8_org, quant_intra_default, quant_inter_default, quant8_intra_default, quant8_inter_default, ScalingList4×4[0 . . . 5] and ScalingList8×8[0 . . . 1]) and second sub-factors (e.g. de-quantization coefficient tables including the dequant_coef[0 . . . 5] and 8×8_dequant_coef[0 . . . 5]). It is to be understood that all the first sub-factors and the second sub-factors may be stored in ROM tables. Before de-quantizing a specific Y, Cb and Or block of an MB (in step S455 of FIG. 4), flags seq_scaling_matrix_present_flag and seq_scaling_list_present_flag[i], or pic_scaling_matrix_present_flag and pic_scaling_list_present_flag[i] for i=0 . . . 7 are acquired from the video sequence header, the picture header, or a header of sequence, slice, picture, GOP or MB layer, and the type of the block of the MB, such as a 4×4 or 8×8 block, an intra or inter block, and a Y, Cb or Cr block, is recognized. At least one QP value for the acquired MB is determined. The details of the QP may follow the description of the first embodiment. A de-quantization table is generated for the block to be decoded is generated and stored in the buffer 1030a. Note that, when the de-quantization table stored in the buffer 1030a can be employed in the block to be decoded, the de-quantization table may not be re-generated. The multiplexer 1050a outputs relevant first sub-factors to the multiplier 1080a according to the acquired flags and the recognized block type and the multiplexer 1070a outputs relevant second sub-factors for the block to be decoded to the multiplier 1080a according to the recognized block type and the QP value. The multiplier 1080a generates a user-defined de-quantization scale InvLevelScale$_{ij}$ by multiplying a de-quantization coefficient dequant$_{ij}$ by a quantization matrix value q-matrix$_{ij}$, where InvLevelScale$_{ij}$ represents a de-quantization scale of row i of column j of a de-quantization table, dequant$_{ij}$ represents a value of row i of column j of the acquired de-quantization coefficient table, and q-matrix$_{ij}$ represents a value of row i of column j of the acquired de-quantization matrix. The de-multiplexer 1090a outputs the generated de-quantization scales to the buffer 1030a. When decoding a particular block of MB as shown in step S455 of FIG. 4, the multiplexer 1050a outputs quantized coefficients to the multiplier 1080a and the multiplexer 1070a outputs the stored de-quantization scales to the multiplier 1080a. The multiplier 1080a generates an inverse quantized coefficient T$_{ij}$ by multiplying a de-quantization scale InvLevelScale$_{ij}$ by a quantized coefficient E$_{ij}$, where T$_{ij}$ represents an inverse quantized coefficient of row i of column j of the currently processed block, E$_{ij}$ represents a quantized coefficient of row i of column j of the currently processed block, which is transformed by the entropy decoding, or entropy decoding and the Hadamard transform, and InvLevelScale$_{ij}$ represents the stored de-quantization scale of row i of column j of the acquired de-quantization table. The de-multiplexer 1090a outputs the inverse quantized coefficients to the subsequent hardware circuit (e.g. an IDCT unit).

Figure 10B:
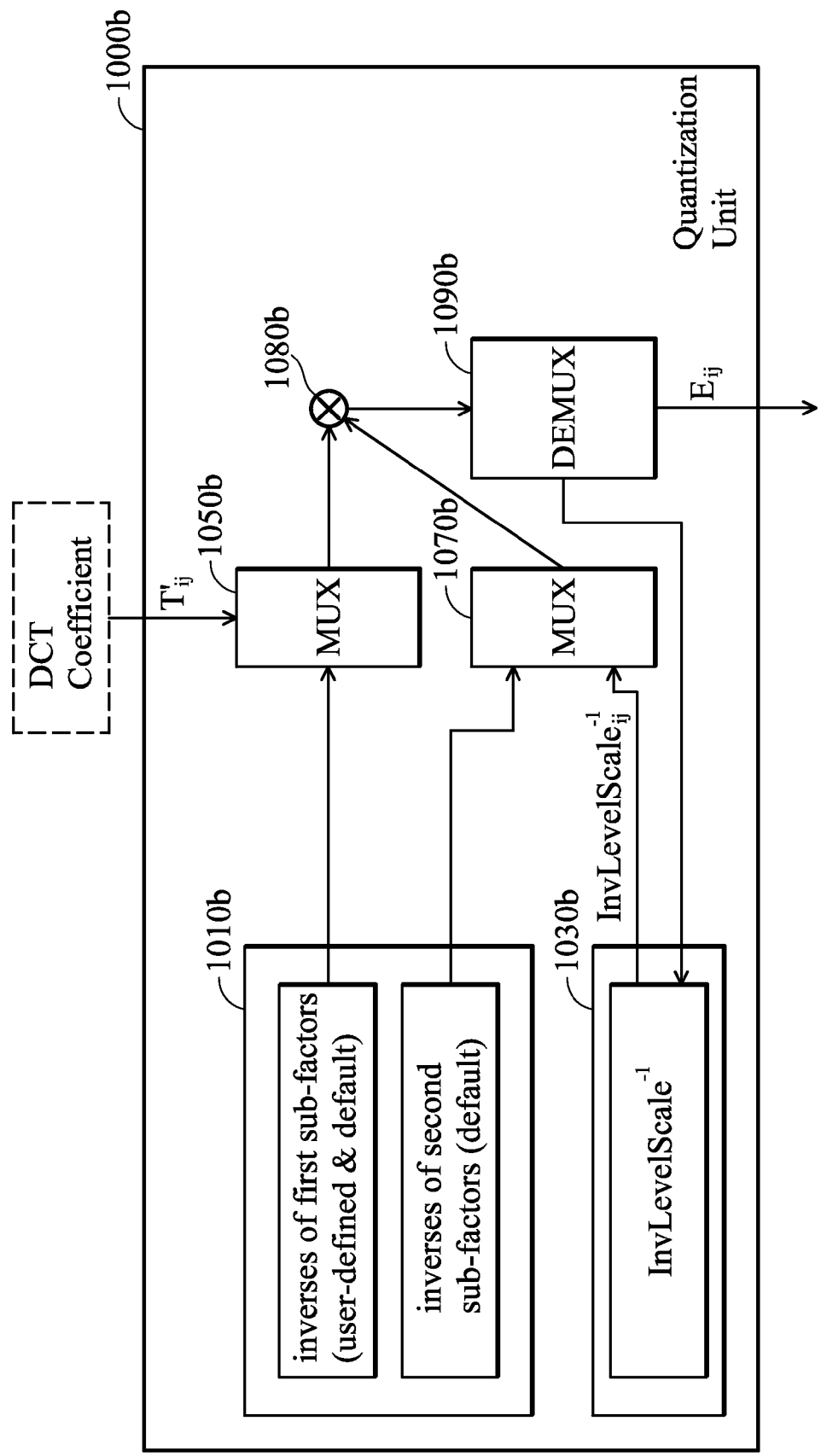

A quantization unit can be deduced by analogy because the de-quantization is the inverse operation of the quantization. FIG. 10b is a diagram of an exemplary quantization unit 1000b comprising a local storage 1010b, such as an SRAM or register, a buffer 1030b, two multiplexers 1050b and 1070b, a multipliers 1080b and a de-multiplexer 1090b. The local storage 1010b initially stores the inverses of all the first sub-factors and second sub-factors. It is to be understood that the inverses of all the first sub-factors and second sub-factors may be initially stored in ROM tables. Before quantizing a specific Y, Cb and Cr block of an MB, a quantization table for a block to be encoded is generated and stored in the buffer 1030b. Note that, when the quantization table stored in the buffer 1030b can be employed in the block to be encoded, the quantization table may not be re-generated. The multiplexer 1050b outputs the inverses of the first sub-factors for the block to be encoded to the multiplier 1080b and the multiplexer 1070b outputs the inverses of the second sub-factors for the block to be encoded to the multiplier 1080b. The multiplier 1080b generates the inverse of a de-quantization scale InvLevelScale$_{ij}^{-1}$ by multiplying the inverse of a de-quantization coefficient dequant$_{ij}^{-1}$ by the inverse of a quantization matrix value q-matrix$_{ij}^{-1}$, where InvLevelScale$_{ij}^{-1}$ represents the inverse of a de-quantization scale of row i of column j of a de-quantization table, dequant$_{ij}^{-1}$ represents the inverse value of row i of column j of a quantization coefficient table for the block to be encoded, and q-matrix$_{ij}^{-1}$ represents the inverse value of row i of column j of a quantization matrix for the block to be encoded. The de-multiplexer 1090b outputs the generated inverses of the de-quantization scales to the buffer 1030b. When encoding a particular block of MB, the multiplexer 1050b outputs transformed coefficients to the multiplier 1080b and the multiplexer 1070b outputs the stored quantization scales to the multiplier 1080b. The multiplier 1080b generates a quantized coefficient E$_{ij}$ by multiplying a quantization scale InvLevelScale$_{ij}^{-1}$ by a transformed coefficient T'$_{ij}$, where E$_{ij}$ represents a quantized coefficient of row i of column j of the currently processed block, T'$_{ij}$ represents a transformed coefficient of row i of column j of the currently processed block, which is transformed by the DCT, and InvLevelScale$_{ij}^{-1}$ represents a stored quantization scale of row i of column j of a quantization table. The de-multiplexer 1090b outputs the quantized coefficients to the subsequent hardware circuit (e.g. a de-quantization unit or an entropy coding unit).

In a seventh embodiment, an exemplary de-quantization unit 1100a as shown in FIG. 11 comprises a local storage 1110a, such as an SRAM or register, a buffer 1150a and two multipliers 1130a and 1170a. The local storage 1110a initially stores all the second sub-factors (e.g. de-quantization coefficient tables including the dequant_coef[0 . . . 5] and 8×8_dequant_coef[0 . . . 5]). It is to be understood that all the second sub-factors may be stored in ROM tables. Before de-quantizing a specific Y, Cb or Or block of an MB (in step S455 of FIG. 4), flags seq_scaling_matrix_present_flag and seq_scaling_list_present_flag[i], or pic_scaling_matrix_present_flag and pic_scaling_list_present_flag[i] for i=0 . . . 7 are acquired from the video sequence header, the picture header, or a header of sequence, slice, picture, GOP or MB layer, and the type of the block of the MB, such as a 4×4 or 8×8 block, an intra or inter block, and a Y, Cb or Cr block, is recognized. At least one QP value for the acquired MB is determined. The details of the QP may follow the description of the first embodiment. First sub-factors (i.e. a quantization matrix) for the block to be decoded are transmitted from external memory (e.g. 330 of FIG. 3) to the multiplier 1130a according to the acquired flags and the recognized block type. A de-quantization table for the block to be decoded is generated and stored in the buffer 1150a. Note that, when the de-quantization table stored in the buffer 1150a can be employed in the block to be decoded, the de-quantization table may not be re-generated. The multiplier 1130a generates a de-quantization scale InvLevelScale$_{ij}$ for a block to be decoded by multiplying a de-quantization coefficient dequant$_{ij}$ by a quantization matrix value q-matrix$_{ij}$, where InvLevelScale$_{ij}$ represents a de-quantization scale of row i of column j of a de-quantization table, dequant$_{ij}$ represents a value of row i of column j of a de-quantization coefficient table being selected based on the recognized block type and the QP value, and q-matrix; represents a value of row i of column j of the received quantization matrix. When decoding a particular block of MB as shown in step S455 of FIG. 4, the multiplier 1170a generates an inverse quantized coefficient $T_{ij}$ by multiplying a de-quantization scale InvLevelScale$_{ij}$ from the buffer 1150a by a quantized coefficient $E_{ij}$, where $T_{ij}$ represents an inverse quantized coefficient of row i of column j of the currently processed block, $E_{ij}$ represents a quantized coefficient of row i of column j of the currently processed block, which is transformed by the entropy decoding, or entropy decoding entropy decoding and the Hadamard transform, and InvLevelScale$_{ij}$ represents the stored de-quantization scale of row i of column j of a de-quantization table.

A quantization unit can be deduced by analogy because the de-quantization is the inverse operation of the quantization. FIG. 11b is a diagram of an exemplary quantization unit 1100b comprising a local storage 1110b, such as an SRAM or register, a buffer 1150b, and two multipliers 1130b and 1170b. The local storage 1110b initially stores the inverses of all the second sub-factors. It is to be understood that the inverses of all the second sub-factors may be initially stored in ROM tables. Before quantizing a specific Y, Cb and Cr block of an MB, the inverses of first sub-factors for the block to be decoded are transmitted from external memory to the multiplier 1130b, and a quantization table for a block to be enceded decoded is generated and stored in the buffer 1150b. Note that, when the quantization table stored in the buffer 1150b can be employed in the block to be encoded, the quantization table may not be re-generated. The multiplier 1130b generates the inverse of a de-quantization scale InvLevelScale$_{ij}^{-1}$ by multiplying the inverse of a de-quantization coefficient dequant$_{ij}^{-1}$ by a de-quantization matrix value q-matrix$_{ij}^{-1}$, where InvLevelScale$_{ij}^{-1}$ represents the inverse of a de-quantization scale of row i of column j of a de-quantization table, dequant$_{ij}^{-1}$ represents the inverse value of row i of column j of a quantization coefficient table for the block to be encoded, and q-matrix$_{ij}^{-1}$ represents the transmitted inverse value of row i of column j of a quantization matrix for the block to be encoded. When encoding a particular block of MB, the multiplier 1170b generates a quantized coefficient $E_{ij}$ by multiplying a quantization scale InvLevelScale$_{ij}^{-1}$ by a transformed coefficient $T'_{ij}$, where $E_{ij}$ represents a quantized coefficient of row i of column j of the currently processed block, $T_{ij}$ represents a transformed coefficient of row i of column j of the currently processed block, which is transformed by the DCT, and InvLevelScale$_{ij}^{-1}$ represents a stored quantization scale of row i of column j of a quantization table.

Figure 12A:
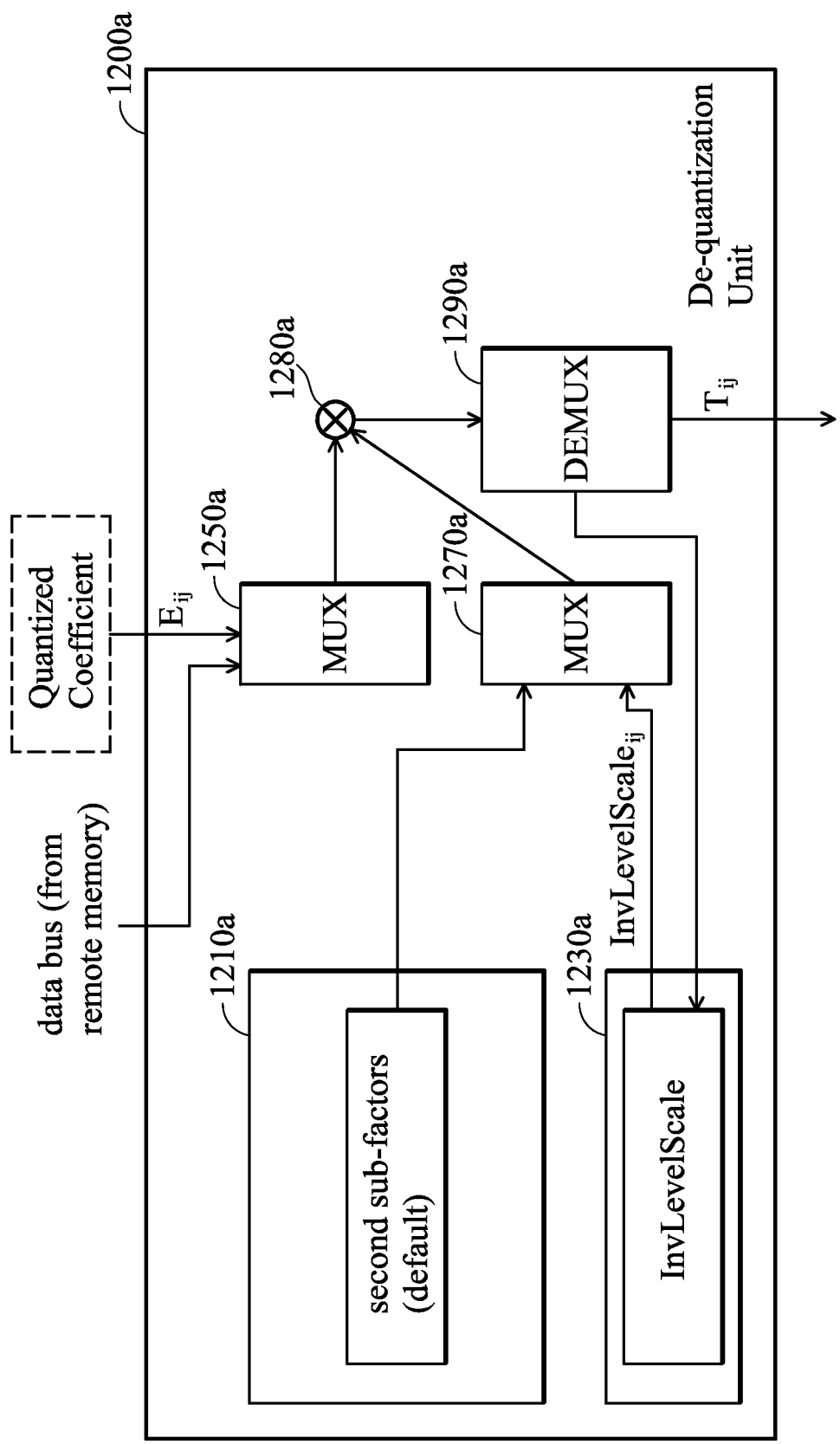

In an eighth embodiment, an exemplary de-quantization unit 1200a as shown in FIG. 12a comprises a local storage 1210a, such as an SRAM or register, a buffer 1230a, two multiplexers 1250a and 1270a, a multiplier 1280a and a de-multiplexer 1290a. The local storage 1210a initially stores all the second sub-factors (e.g. de-quantization coefficient tables including the dequant_coef[0 . . . 5] and 8×8_dequant_coef[0 . . . 5]). It is to be understood that all the second sub-factors may be stored in ROM tables. Before de-quantizing a specific Y, Cb and Or block of an MB (in step S455 of FIG. 4), flags seq_scaling_matrix_present_flag and seq_scaling_list_present_flag[i], or pic_scaling_matrix_present_flag and pic_scaling_list_present_flag[i] for i=0 . . . 7 are acquired from the video sequence header, the picture header, or a header of sequence, slice, picture, GOP or MB layer, and the type of the block of the MB, such as a 4×4 or 8×8 block, an intra or inter block, and a Y, Cb or Or block, is recognized. At least one QP value for the acquired MB is determined. The details of the QP may follow the description of the first embodiment. First sub-factors (i.e. a quantization matrix) for the block to be decoded are transmitted from external memory (e.g. 330 of FIG. 3) to the multiplexer 1250a according to the acquired flags and the recognized block type. A de-quantization table is generated for the block to be decoded and stored in the buffer 1230a. Note that, when the de-quantization table stored in the buffer 1230a can be employed in the block to be decoded, the de-quantization table may not be re-generated. The multiplexer 1250a outputs the received first sub-factors to the multiplier 1280a and the multiplexer 1270a outputs relevant second sub-factors for the block to be decoded to the multiplier 1280a according to the recognized block type and the QP value. The multiplier 1280a generates a user-defined de-quantization scale InvLevelScale$_{ij}$ by multiplying a de-quantization coefficient dequant$_{ij}$ by a quantization matrix value q-matrix$_{ij}$, where InvLevelScale$_{ij}$ represents a de-quantization scale of row i of column j of a de-quantization table, dequant$_{ij}$ represents a value of row i of column j of the acquired de-quantization coefficient table, and q-matrix$_{ij}$ represents a value of row of column j of the received quantization matrix. The de-multiplexer 1290a outputs the generated de-quantization scales to the buffer 1230a. When decoding a particular block of MB as shown in step S455 of FIG. 4, the multiplexer 1250a outputs quantized coefficients to the multiplier 1280a and the multiplexer 1270a outputs the stored de-quantization scales to the multiplier 1280a. The multiplier 1280a generates an inverse quantized coefficient $T_{ij}$ by multiplying a de-quantization scale InvLevelScale$_{ij}$ by a quantized coefficient $E_{ij}$, where $T_{ij}$ represents an inverse quantized coefficient of row i of column j of the currently processed block, $E_{ij}$ represents a quantized coefficient of row i of column j of the currently processed block, which is transformed by the entropy decoding, or entropy decoding and the Hadamard transform, and InvLevelScale$_{ij}$ represents the stored de-quantization scale of row i of column j of the acquired de-quantization table. The de-multiplexer 1290a outputs the inverse quantized coefficients to the subsequent hardware circuit (e.g. an IDCT unit).

Figure 12B:
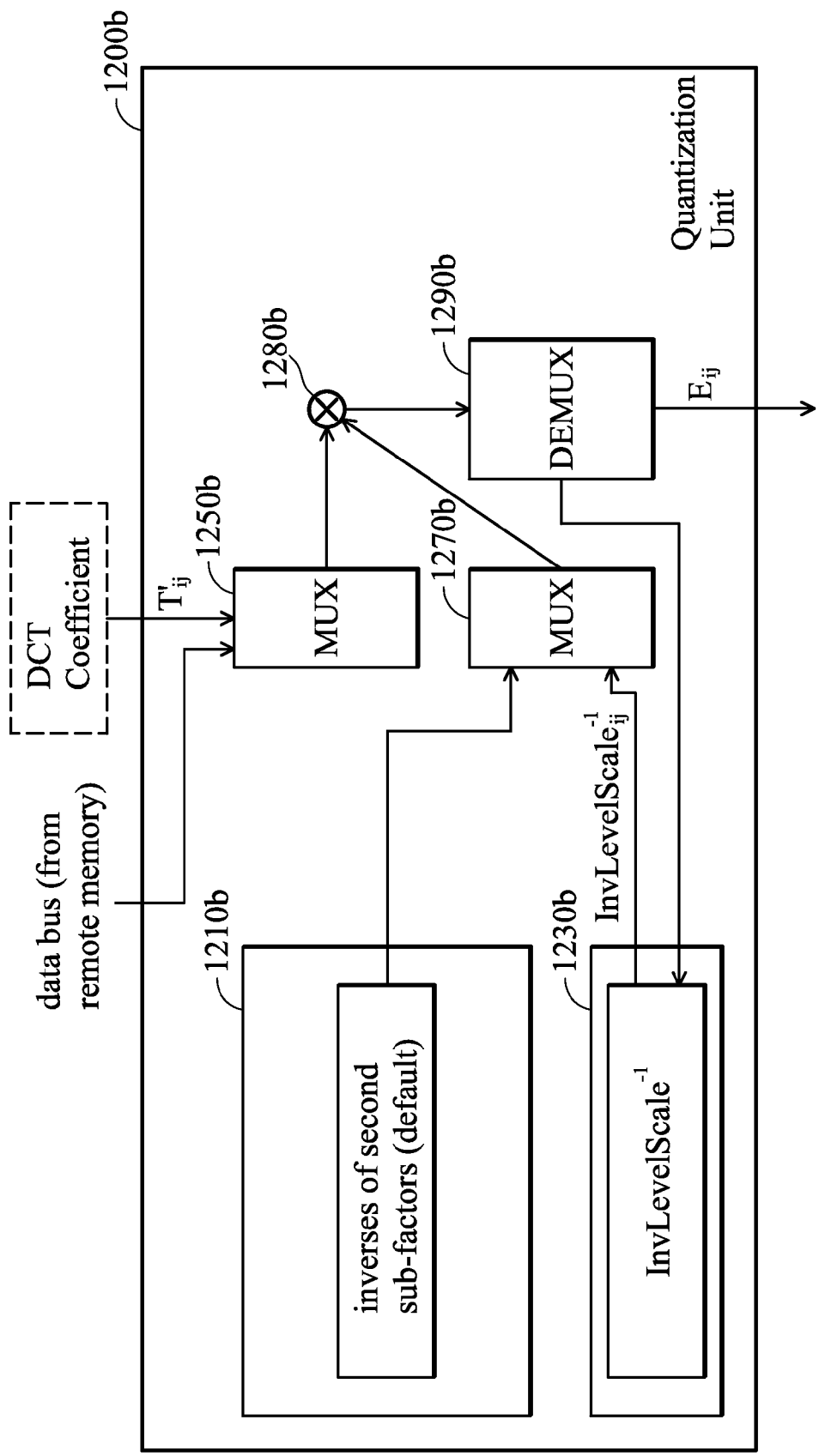

A quantization unit can be deduced by analogy because the de-quantization is the inverse operation of the quantization. FIG. 12b is a diagram of an exemplary quantization unit 1200b comprising a local storage 1210b, such as an SRAM or register, a buffer 1230b, two multiplexers 1250b and 1270b, a multipliers 1280b and a de-multiplexer 1290b. The local storage 1210b initially stores the inverses of all the second sub-factors. It is to be understood that the inverses of all the second sub-factors may be initially stored in ROM tables. Before quantizing a specific Y, Cb and Cr block of an MB, the inverses of first sub-factors for the block to be encoded are transmitted from external memory to the multiplexer 1250b. A quantization table for a block to be encoded is generated and stored in the buffer 1230b. Note that, when the quantization table stored in the buffer 1230b can be employed in the block to be encoded, the quantization table may not be re-generated. The multiplexer 1250b outputs the inverses of the first sub-factors for the block to be encoded to the multiplier 1280b and the multiplexer 1270a outputs the inverses of the second sub-factors for the block to be encoded to the multiplier 1280b. The multiplier 1280b generates the inverse of a de-quantization scale InvLevelScale$_{ij}^{-1}$ by multiplying the inverse of a de-quantization coefficient dequant$_{ij}^{-1}$ by the inverse of a quantization matrix value q-matrix$_{ij}^{-1}$, where InvLevelScale$_{ij}^{-1}$ represents the inverse of a de-quantization scale of row i of column j of a de-quantization table, dequan-t$_{ij}^{-1}$ represents the inverse value of row i of column j of a de-quantization coefficient table for the block to be encoded, and q-matrix$_{ij}^{-1}$ represents the inverse value of row i of column j of the received quantization matrix. The de-multiplexer 1290b outputs the generated inverses of the de-quantization scales to the buffer 1230b. When encoding a particular block of MB, the multiplexer 1250b outputs transformed coefficients to the multiplier 1280b and the multiplexer 1270b outputs the stored quantization scales to the multiplier 1280b. The multiplier 1280b generates a quantized coefficient $E_{ij}$ by multiplying a quantization scale $\text{InvLevelScale}_{ij}^{-1}$ by a transformed coefficient $T'_{ij}$, where $E_{ij}$ represents a quantized coefficient of row i of column j of the currently processed block, $T'_{ij}$ represents a transformed coefficient of row i of column j of the currently processed block, which is transformed by the DCT, and $\text{InvLevelScale}_{ij}^{-1}$ represents a stored quantization scale of row i of column j of a quantization table. The demultiplexer 1290b outputs the quantized coefficients to the subsequent hardware circuit (e.g. a de-quantization unit or an entropy coding unit).

Figure 11A:
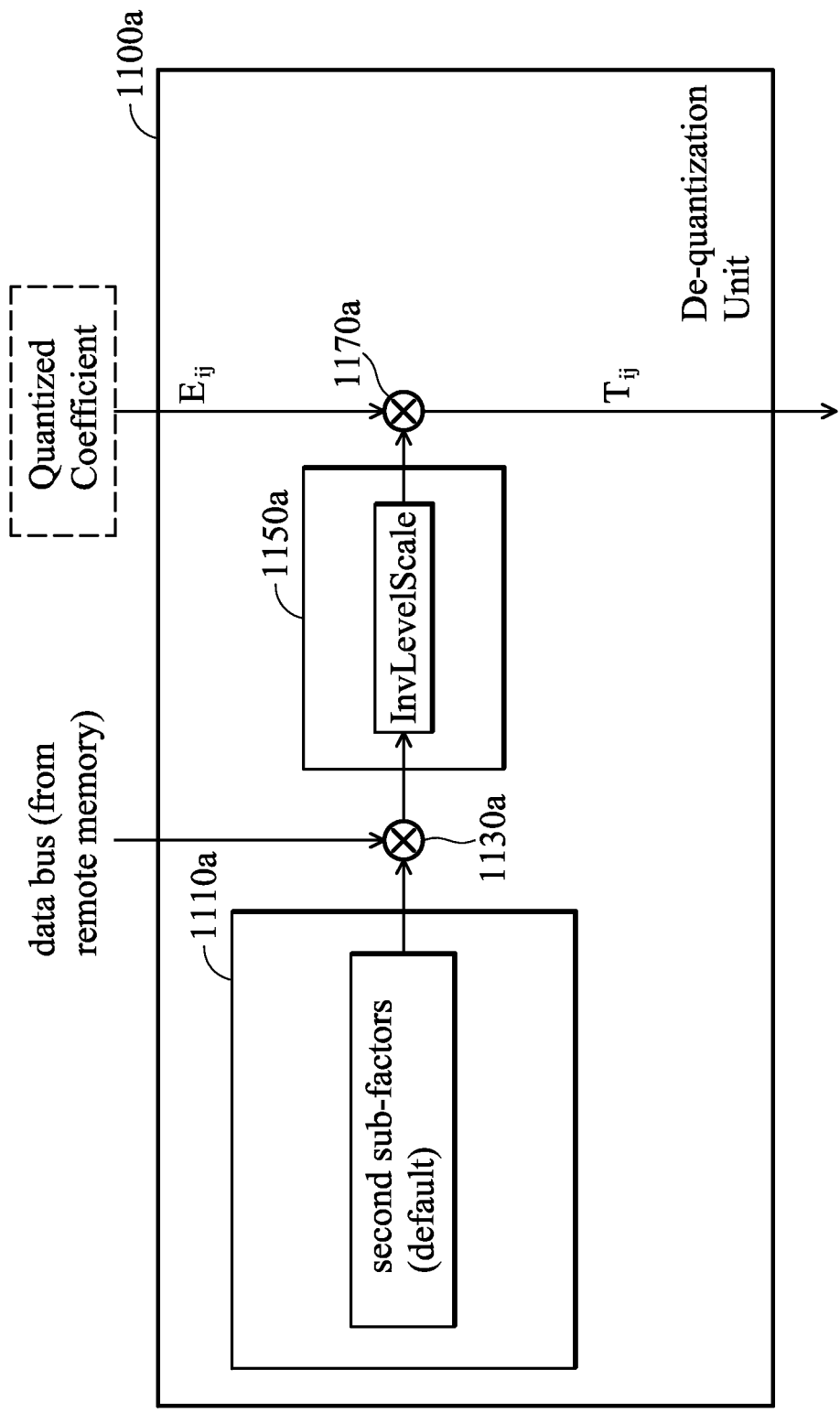
Figure 11B:
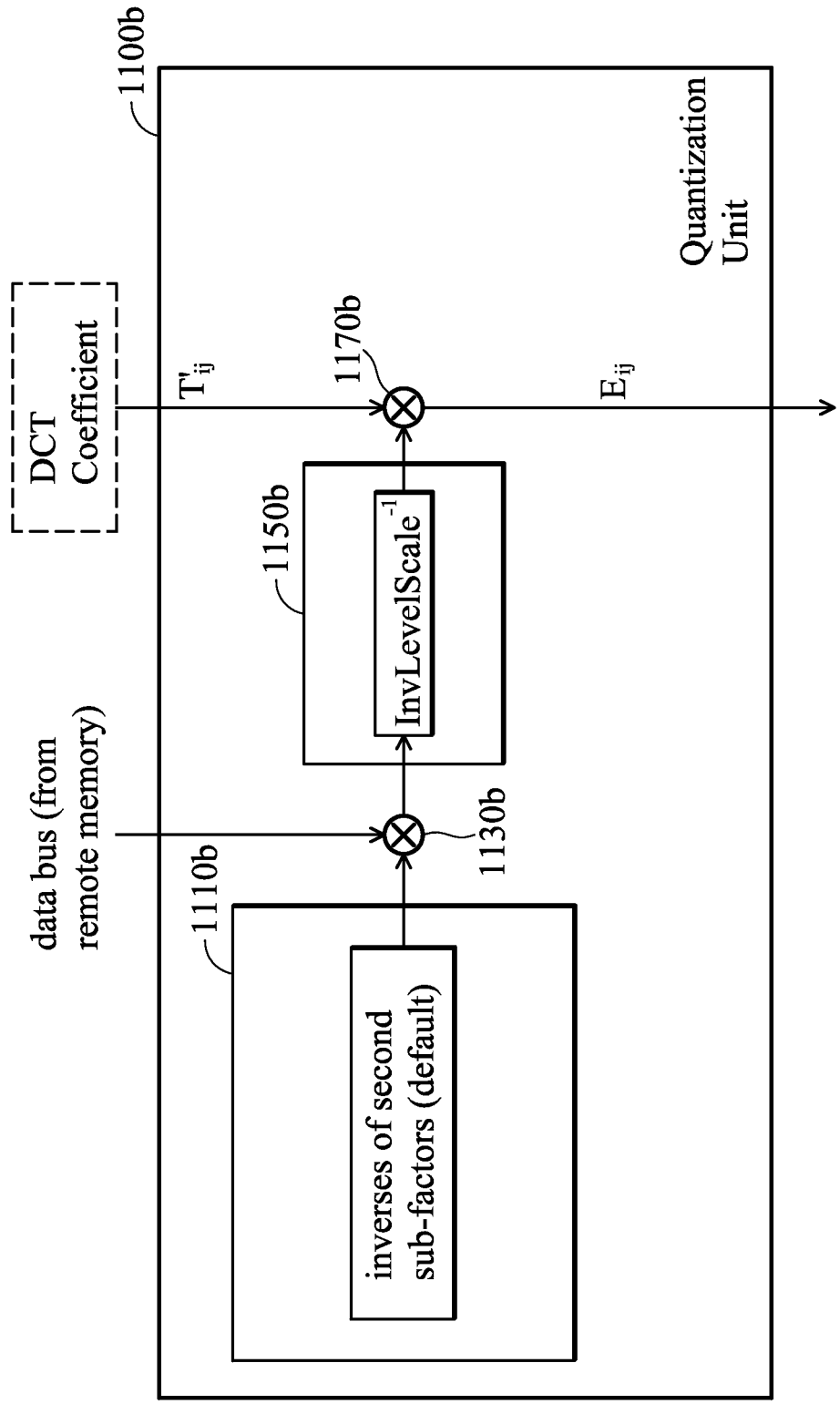

Those skilled in the art may physically implement the disclosed dual multipliers in a single multiplier, such as 630a and 650a of FIG. 6a, 630b and 650b of FIG. 6b, 750a and 770a of FIG. 7a, 750b and 770b of FIG. 7b, 830a and 870a of FIG. 8a, 830b and 870b of FIG. 8b, 930a and 970a of FIG. 9a, 930b and 970b of FIG. 9b, 1130a and 1170a of FIG. 11a, or 1130b and 1170b of FIG. 11b, where the single multiplier may selectively and cyclically acquire different sources to generate results, and deliver to different destinations according to a control signal.

The default quantization matrix (e.g. the quant_org, quant8_org, quant_intra_default, quant_inter_default, quant8_intra_default or quant8_inter_default) or de-quantization coefficient table (e.g. one of the dequant_coef[0 . . . 5] or one of the dequant_coef8[0 . . . 5]) may be initially stored in a compressed format. In an example, each value of a default quantization matrix, except for the first value, is replaced with the difference from the prior value. The default quantization matrix may be scanned in zigzag order. A new 8×8 intra default q-matrix "quant8_intra_default" containing the first value and differential values is shown in the following:

```
int new_quant8_intra_default[64] = {
6, 4, 2, 3, 0, 5, 0, 0,
0, -2, 0, 0, 0, 0, 0, 2,
3, 0, 0, 0, 0, 0, 0, 0,
0, 0, 0, 0, 0, 0, 0, 2,
0, 0, 0, 0, 0, 0, 0, 0,
0, 0, 0, 0, 0, 0, 0, 0,
2, 0, 2, 0, 3, 0, 2, 2
}.
```

Thus, each value of the new_quant8_intra_default can be represented by three bits to reduce required storage capacity. It is to be understood that the differential values may be further encoded in run-length coding to generate a variable length coding (VLC) stream. When reversing the new_quan8_intra_default to the quan8_intra_default, the VLC stream is decoded in run-length decoding to acquire the new_quan8_intra_default if required, and each differential value is added to the prior inverted value to acquire the inverted value.

In another example, each value of a later de-quantization coefficient table is the difference from a corresponding value of a former de-quantization coefficient table, where the latter and former de-quantization coefficient tables are in the same dimension (e.g. 4×4 or 8×8). A new 8×8 de-quantization coefficient table "dequant_coef8[1]" containing differential values from the former 8×8 de-quantization coefficient table "dequant_coef8[0]" is shown in the following:

```
Static const int new_dequant_coef8[1][8][8] = {
2, 2, 3, 2, 2, 2, 3, 2,
2, 1, 2, 1, 2, 1, 2, 1,
3, 2, 3, 2, 3, 2, 3, 2,
2, 1, 2, 1, 2, 1, 2, 1,
2, 2, 3, 2, 2, 2, 3, 2,
2, 1, 2, 1, 2, 1, 2, 1,
3, 2, 3, 2, 3, 2, 3, 2,
2, 1, 2, 1, 2, 1, 2, 1
}.
```

Except for the first value, each value of the newly generated de-quantization coefficient table may be further replaced with the difference from the prior value. The values of the newly generated quantization matrix or de-quantization coefficient table may be scanned in zigzag order. The differential values may then be further encoded in run-length coding to generate a VLC stream. When reversing the new_dequant_coef8[1] to the dequant_coef8[1], the VLC stream is decoded in run-length decoding to acquire an encoded de-quantization coefficient table comprising an original value and multiple differential values in sequence (e.g. zigzag order) if required, each differential value of the acquired de-quantization coefficient table is added to the prior inverted value in order to acquire the new_dequant_coef8[1] if required, and each value of the new_dequant_coef8[1] is added to a corresponding value of the dequant_coef8[0] in order to acquire dequant_coef8[1].

In another example, the 4×4 de-quantization coefficient table (e.g. one of the dequant_coef[0 . . . 5]) can be represented by only three values. Typically, values of each 4×4 de-quantization coefficient table are deployed in a generic pattern represented as shown in the following:

```
Static const int dequant_coef = {
a², ab, a², ab,
ab, b², ab, b²,
a², ab, a², ab,
ab, b², ab, b²}.
```

Thus, for each 4×4 de-quantization coefficient table, only three values are initially stored in a local storage to save storage capacity. Specifically, for the dequant_coef[0], only "10", "13" and "16" are initially stored in a local storage. When delivering the dequant_coef[0], the stored values are respectively output in a predetermined sequence, such as "10, 13, 10, 13, 13, 16, 13, 16, 10, 13, 10, 13, 13, 16, 13, 16". The compression of the original q-matrices and the default q-matrices can be deduced by analogy.

In another example, the 8×8 de-quantization coefficient table (e.g. one of the dequant_coef8[0 . . . 5]) can be divided into four portions, and each portion contains the same coefficient values. Exemplary dequant_coef8[0] is shown in the following:

```
Static const int dequant_coef8[0] = {
A, A,
A, A};
A = {
20, 19, 25, 19,
19, 18, 24, 18,
25, 24, 32, 24,
19, 18, 24, 18}.
```

Thus, for each 8×8 de-quantization coefficient table, only six values are initially stored in a local storage to save storage capacity. Specifically, for the dequant_coef8[0], only "20", "19", "25", "18", "24" and "32" are initially stored in a local storage. When delivering the dequant_coef8[0], the stored values are respectively output in a predetermined sequence.

Figure 13:
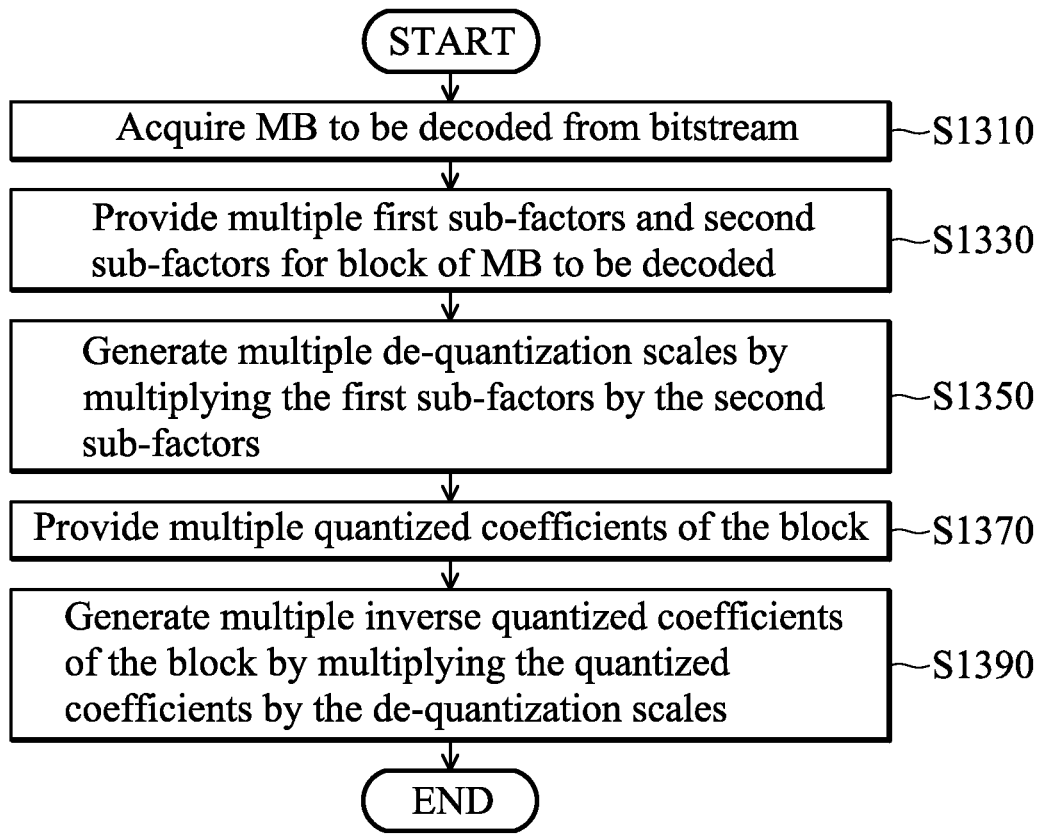
FIG. 13 is a flowchart illustrating an embodiment of a method for de-quantizing a block of a macro-block (MB)

FIG. 13 is a flowchart illustrating an embodiment of a method for de-quantizing a block of an MB, performed by a de-quantization unit implemented in a silicon, such as 600a, 700a, 800a, 900a, 1000a, 1100a or 1200a, or a general-purposed processor. In step S1310, an MB to be decoded is acquired from a bitstream. In step S1330, multiple first sub-factors, such as values of original q-matrices, default q-matrices, and/or user-defined q-matrices, and second sub-factors, such as values of de-quantization coefficient tables, are provided for a block of the MB to be decoded. In an example, step S1330 may actually generate the first and second sub-factors as described above. In another example, step S1330 may retrieve the first and second sub-factors from memory, where these sub-factors are generated before step S1310. In step S1350, multiple de-quantization scales are generated by multiplying the first sub-factors by the second sub-factors. In step S1370, multiple quantized coefficients of the block are provided. Multiplying the quantized coefficients by the de-quantization scales, in step S1390, generates multiple inverse quantized coefficients of the block.

Figure 14:
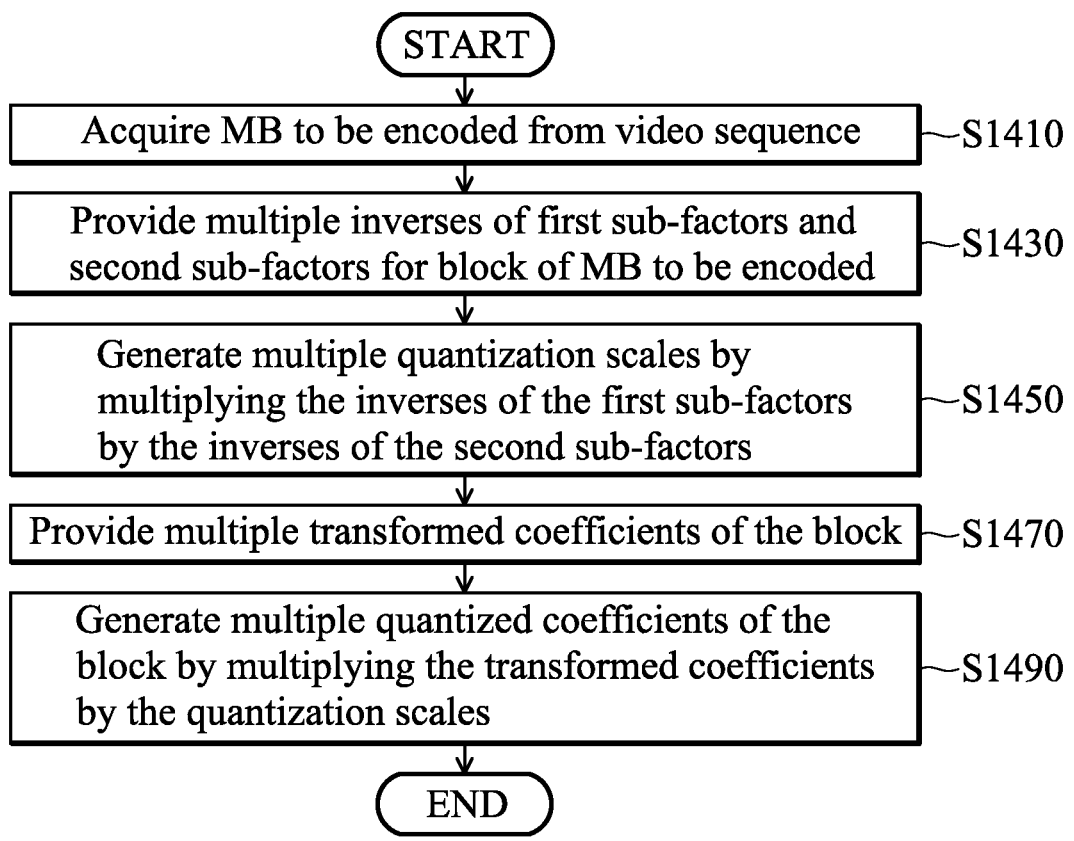
FIG. 14 is a flowchart illustrating an embodiment of a method for quantizing a block of an MB.

FIG. 14 is a flowchart illustrating an embodiment of a method implemented in a silicon for quantizing a block of an MB, performed by a quantization unit, such as 600b, 700b, 800b, 900b, 1000b, 1100b or 1200b, or a general-purpose processor. In step S1410, an MB to be encoded is acquired from a video sequence. In step S1430, multiple inverses of first sub-factors and second sub-factors are provided for a block of the MB. In an example, step S1430 may actually generate the inverses of the first and second sub-factors as described above. In another example, step S1430 may retrieve the inverses of the first and second sub-factors from memory, where these inverses are generated before step S1410. It is to be understood that the inverse of the first or second sub-factor may not be limited to 1/(first or second sub-factor), and the relationship between first or second sub-factor and the inverse thereof is predefined and may refer to any relevant specification known by those skilled in the art. In step S1450, multiple quantization scales are generated by multiplying the inverse of the first sub-factors by the inverses of the second sub-factors. In step S1470, multiple transformed coefficients of the block are provided. In step S1490, multiple quantized coefficients of the block are generated by multiplying the transformed coefficients by the quantization scales.

Methods for quantization and de-quantization, or certain aspects or portions thereof, may take the form of program codes (i.e., instructions) embodied in tangible media, such as floppy diskettes, CD-ROMS, hard drives, or any other machine-readable storage medium, wherein, when the program codes are loaded into and executed by a machine, such as a computer, a DVD player, a DVD recorder, a mobile phone, or similar, the machine becomes an apparatus for practicing the invention. The disclosed methods may also be embodied in the form of program codes transmitted over some transmission medium, such as electrical wiring or cabling, through fiber optics, or via any other form of transmission, wherein, when the program codes are received and loaded into and executed by a machine, such as a computer, the machine becomes an apparatus for practicing the invention. When implemented on a general-purpose processor, the program codes combine with the processor to provide a unique apparatus that operate analogously to specific logic circuits.

Certain terms are used throughout the description and claims to refer to particular system components. As one skilled in the art will appreciate, consumer electronic equipment manufacturers may refer to a component by different names. This document does not intend to distinguish between components that differ in name but not function.

Although the invention has been described in terms of preferred embodiment, it is not limited thereto. Those skilled in the art can make various alterations and modifications without departing from the scope and spirit of the invention. Therefore, the scope of the invention shall be defined and protected by the following claims and their equivalents.

What is claimed is:

1. An electronic device for de-quantization comprising:
a local storage storing a plurality of first default sub-factors, a plurality of first user-defined sub-factors and a plurality of second sub-factors;
a multiplexer connected to the local storage and selectively outputting one of the first default sub-factors and the first user-defined sub-factors for a block of a macro-block (MB) of a bitstream to be decoded;
a first multiplier generating a plurality of de-quantization scales by multiplying the first default or user-defined sub-factors outputted from the multiplexer by the second sub-factors for the block; and
a second multiplier connected to the first multiplier, and generating a plurality of inverse quantized coefficients by multiplying the de-quantization scales from the first multiplier by a plurality of quantized coefficients.

2. An electronic device for quantization comprising:
a local storage storing at least two of a plurality of inverses of first default sub-factors, a plurality of inverses of first user-defined sub-factors and a plurality of inverses of second sub-factors;
a multiplexer connected to the local storage and selectively outputting one of the inverses of first default sub-factors and the inverses of first user-defined sub-factors for a block of a macro-block (MB) to be encoded;
a first multiplier generating a plurality of quantization scales by multiplying the inverses of first default sub-factors or the inverses of first user-defined sub-factors by the inverses of second sub-factors for the block; and
a second multiplier connected to the first multiplier, and generating a plurality of quantized coefficients by multiplying the quantization scales from the first multiplier by a plurality of transformed coefficients.

3. The electronic device as claimed in claim 1, wherein one of the first default sub-factors and the first user-defined sub-factors are outputted from the multiplexer according to information carried in a header of the bitstream.

4. The electronic device as claimed in claim 3, wherein a relevant matrix of the selected one of first default and user-defined sub-factors are outputted from the multiplexer according to a block type of the block.

5. The electronic device as claimed in claim 1, wherein the first default sub-factors and the second sub-factors are stored in ROM table.

6. The electronic device as claimed in claim 2, wherein the inverses of first default sub-factors and the inverses of second sub-factors are stored in ROM table.

* * * * *